United States Patent
Rodriguez et al.

(10) Patent No.: US 11,120,209 B2
(45) Date of Patent: *Sep. 14, 2021

(54) EXTRACTING STRUCTURED INFORMATION FROM A DOCUMENT CONTAINING FILLED FORM IMAGES

(71) Applicant: International Business Machines Corporation, Armonk, NY (US)

(72) Inventors: Antonio Foncubierta Rodriguez, Zurich (CH); Guillaume Jaume, Zurich (CH); Maria Gabrani, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,815

(22) Filed: Jul. 10, 2020

(65) Prior Publication Data

US 2020/0410160 A1 Dec. 31, 2020

Related U.S. Application Data

(63) Continuation of application No. 16/192,028, filed on Nov. 15, 2018, now Pat. No. 10,755,039.

(51) Int. Cl.
*G06F 17/00* (2019.01)
*G06F 40/174* (2020.01)
(Continued)

(52) U.S. Cl.
CPC .......... *G06F 40/174* (2020.01); *G06F 40/103* (2020.01); *G06F 40/186* (2020.01);
(Continued)

(58) Field of Classification Search
CPC .... G06F 40/174; G06F 40/103; G06F 40/253; G06F 40/186; G06K 9/00449; G06K 9/00469; G06K 9/00456; G06K 9/00463
See application file for complete search history.

(56) References Cited

U.S. PATENT DOCUMENTS 4,567,610 A    1/1986  McConnell
7,561,734 B1   7/2009  Wnek
(Continued)

FOREIGN PATENT DOCUMENTS

CN    106126491    6/2016

OTHER PUBLICATIONS

IPCOM000204102D; A Process for Using a Stored Semantic Representation of a Document, A Semantic Bookmark, To Locate Similar Documents in the Future Feb. 11, 2011.
(Continued)

*Primary Examiner* — Scott T Baderman
*Assistant Examiner* — Barbara M Level
(74) *Attorney, Agent, or Firm* — Fleit Intellectual Property Law; Jon Gibbons

(57) ABSTRACT

A system and process for extracting information from filled form images is described. In one example the claimed invention first extracts textual information and the hierarchy in a blank form. This information is then used to extract and understand the content of filled forms. In this way, the system does not have to analyze from the beginning each filled form. The system is designed so that it remains as generic as possible. The number of hard coded rules in the whole pipeline was minimized to offer an adaptive solution able to address the largest number of forms, with various structures and typography. The system is also created to be integrated as a built-in function in a larger pipeline. The form understanding pipeline could be the starting point of any advanced Natural Language Processing application.

25 Claims, 31 Drawing Sheets

(51) Int. Cl.
    *G06K 9/00*     (2006.01)
    *G06F 40/186*     (2020.01)
    *G06F 40/103*     (2020.01)
    *G06F 40/253*     (2020.01)

(52) U.S. Cl.
    CPC ....... *G06F 40/253* (2020.01); *G06K 9/00449* (2013.01); *G06K 9/00456* (2013.01); *G06K 9/00463* (2013.01)

(56) References Cited

U.S. PATENT DOCUMENTS

| | | | |
|---|---|---|---|
| 7,660,779 | B2 | 2/2010 | Goodman et al. |
| 7,840,891 | B1 | 11/2010 | Yu et al. |
| 9,374,501 | B2 * | 6/2016 | Wshah ................ H04N 1/4177 |
| 10,089,292 | B2 | 10/2018 | Shetty et al. |
| 2007/0168382 | A1 | 7/2007 | Tillberg et al. |
| 2011/0173560 | A1 | 7/2011 | Larcheveque et al. |
| 2011/0249905 | A1 | 10/2011 | Singh et al. |
| 2012/0201420 | A1 | 8/2012 | Zuev et al. |
| 2013/0198615 | A1 | 8/2013 | Zuev et al. |
| 2015/0058374 | A1 | 2/2015 | Golubev et al. |
| 2016/0132738 | A1 | 5/2016 | Biegert et al. |
| 2016/0335494 | A1 | 11/2016 | Ho |
| 2016/0364608 | A1 | 12/2016 | Sengupta et al. |
| 2019/0102375 | A1 | 4/2019 | Goulikar et al. |

OTHER PUBLICATIONS

IPCOM000230917D; System and Method for Generating Integrated High Fidelity Documents From Multiple Similar, Possibly Duplicate Documents Sep. 18, 2013.
IPCOM000256074D; Involuntary Revolution of Formless/Semi-Structured Document and Applying Different Analytics Nov. 2, 2018.
O'Gorman, L. et al.; Document Image Analysis 1997.
Paab, G. et al.; Machine Learning for Document Structure Recognition Jan. 2011.
List of IBM Patents or Patent Applications Treated as Related.

* cited by examiner

SUSPECT ADVERSE REACTION REPORT

I. REACTION INFORMATION

| 1. PATIENT INITIALS (first, last) | 1a. COUNTRY | 2. DATE OF BIRTH | 2a. AGE | 3. SEX | 4-6 REACTION ONSET | 8-12 CHECK ALL APPROPRIATE TO ADVERSE REACTION |
|---|---|---|---|---|---|---|
| | | Day Month Year | Years | | Day Month Year | |
| DE | UK | 23  01  1937 | 80 | Fem | 15  09  2017 | |

7 + 13 DESCRIBE REACTION(S) (including relevant tests/lab data)

Pain in right hip
Laceration without foreign body, left lower leg, subsequent encounter ☒ PATIENT DIED
☐ INVOLVED OR PROLONGED INPATIENT HOSPITALISATION
☒ INVOLVED PERSISTENCE OR SIGNIFICANT DISABILITY OR INCAPACITY
☐ LIFE THREATENING

SUSPECT ADVERSE REACTION REPORT

I. REACTION INFORMATION

| 1. PATIENT INITIALS (first, last) | 1a. COUNTRY | 2. DATE OF BIRTH | | | 2a. AGE | 3. SEX | 4-6 REACTION ONSET | | | 8-12 CHECK ALL APPROPRIATE TO ADVERSE REACTION |
|---|---|---|---|---|---|---|---|---|---|---|
| | | Day | Month | Year | Years | | Day | Month | Year | |
| DE | UK | 23 | 01 | 1937 | 80 | Fem | 15 | 09 | 2017 | ☒ PATIENT DIED<br>☐ INVOLVED OR PROLONGED INPATIENT HOSPITALISATION<br>☒ INVOLVED PERSISTENCE OR SIGNIFICANT DISABILITY OR INCAPACITY<br>☐ LIFE THREATENING |

7 + 13 DESCRIBE REACTION(S) (including relevant tests/lab data)

Pain in right hip
Laceration without foreign body, left lower leg, subsequent encounter

FIG. 19

SUSPECT ADVERSE REACTION REPORT

REACTION INFORMATION

| 1. PATIENT INITIALS (first, last) | 1a. COUNTRY | 2. DATE OF BIRTH Day / Month / Year | 2a. AGE Years | 3. SEX | 4-6 REACTION ONSET Day / Month / Year | 8-12 CHECK ALL APPROPRIATE TO ADVERSE REACTION |
|---|---|---|---|---|---|---|
| DE | UK | 22 / 10 / 1977 | 30 | fam | 15 / 09 / 2017 | ☐ PATIENT DIED<br>☐ INVOLVED OR PROLONGED INPATIENT HOSPITALISATION<br>☐ INVOLVED PERSISTENCE OR SIGNIFICANT DISABILITY OR INCAPACITY<br>☐ LIFE THREATENING |

7. + 13 DESCRIBE REACTION(S) (including relevant tests/lab data)

Pain in right hip
Laceration without foreign body, left lower leg, subsequent encounter

FIG. 20

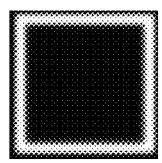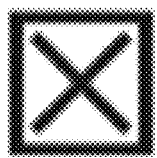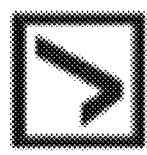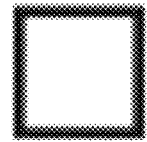
FIG. 21

8-12 CHECK ALL
APPROPRIATE
TO ADVERSE
REACTION

☐ PATIENT DIED

☐ INVOLVED OR
PROLONGED
INPATIENT
HOSPITALISATION

☐ INVOLVED
PERSISTENCE OR
SIGNIFICANT
DISABILITY OR
INCAPACITY

☐ LIFE
THREATENING 8-12 CHECK ALL
APPROPRIATE
TO ADVERSE
REACTION

☐ PATIENT DIED

☐ LIFE THREATENING

☒ INVOLVED OR
PROLONGED INPATIENT
HOSPITALISATION

☐ RESULTS IN
PERSISTENCE OR SIGNIFICANT
DISABILITY / INCAPACITY

☐ CONGENITAL ANOMALY

☐ OTHER MEDICALLY IMPORTANT
CONDITION

FIG. 22

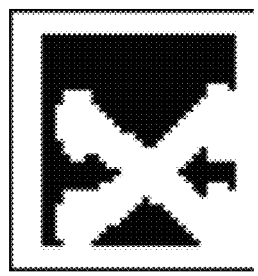
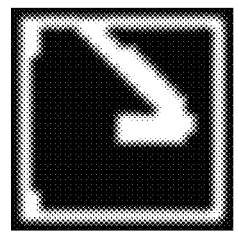
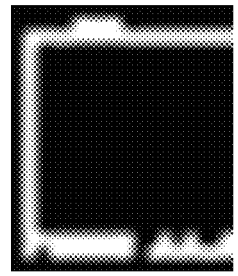
FIG. 23

```
1  {
2  "page":
3       "info": {
4       "format": "pdf",
5       "width": 2550.0,
6       "height": 3300.0,
7       "execution time in s" 19.555557882
8       },
9       "page_ content": {
10      "sections•: I
11        {
12      "text': "undefined Section",
13      "attribute': "NO_ATTRIBUTE°,
14      "other":[
15          {
16             "text": "CIOMS FORM"
17          },
18          {
19             "text": "SUSPECT ADVERSE REACTION REPORT"
20          }
21          ]
22        },
23        {
24             "text": "I. REACTION INFORPATION",
25      "attribute": "EVENT CHARACTERISTICS",
26      "sections": I
27
28      "text": '2. DATE or minim",
29      "attribute": "PATIENT CHARACTERISTICS',
30      "sections": [
31          {
32              "question_text": "Day",
33                "tickbox": false,
34          },
35           {
36              "question_text": "Month",
37                "tickbox": false
38          },
39          {
40                "question_text": "Year",
41                "tickbox": false
42          },
43      ]
44      },
45         {
46      'text': "4-6 REACTION ONSET",
47      "attribute": "EVERT CHARACTERISTICS',
48      "questions": [
49          {
50  'question-text": "Day",
51  'tickbox':
52 },
53
54  'question_text": "Month',
53  'tickbox':
56                },
57            {
58  equostinn_text": 'Year',
59  "tickbox": false,
60                }
61          ]
```

FIG. 27

```
1  {
2    "page": {
3      "info": 1
4        "form type": 'CIOMS',
5        "format': jpg".
6        "page id": 1,
7        "number of pages#: 1,
8          "image width": 2480,
9        "image height': 3507
10     },
11   "page_content": {
12     "sections": {
13       {
14         "text": "Undefined Section",
15         "other":
16       {
17         "text": "CIOMS FORM",
18         "bbox": [
19     2041.0,
20     410.0,
21     2350.0,
22     380.0
23         ],
24         },
25       {
26         "text": "SUSPECT ADVERSEZ REACTION REPORT",
27         'bbox": [
28     442.0,
29     613_0,
30     1286.0,
31     580.0
32         ],
33       }
34       ]
35       },
36     {
37       "text': '1. REACTION INFORMATION",
38       "sections": [
39       {
40         "texts": "2. DATE OF BIRTH",
41         "questions": [
42           {
43             "question_text": "Day",
44             "answer": "04"
45             "tickbox": false,
46             "tabular": false,
47             "bbox: [
48               1035.0,
49               951.0.
50               1120.0,
51               381.0
52             ]
53             "confidence": 91.0
54   },
55       {
56         "question_text": "Month",
57         "answer": "02",
58         "tickbox": false,
59         "tabular": false,
60         "bbox": [
61           1134.0,
62           951.0.
63           1250.0,
64           361.0
65         ]
66         "confidence": 90.0
67   },
68       {
```

FIG. 28

| Source | ☐ Spontaneous | ☐ Comp. Use | ☐ Lit | ☐ Other, Specify _____ | | | |
|---|---|---|---|---|---|---|---|
| Suspect Drug | 2902 | 2904 | | 2906 | 2908 | 2910 | 2912 |
| Drug, Formulation, Strength, Route (e.g. Capsules, 5mg, oral) | Dose & frequency | | Lot/Batch no. | Therapy Start date dd.mmm.yy | Therapy Stop date dd.mmm.yy | Indication for use of drug | |
| DRUG A | 10mg | daily | N/A | 1/12/18 | 2/12/18 | 230 | |
| DRUG B | 10mg | daily | N/A | 1/12/18 | 2/12/18 | 230 | |
| DRUG C | 10mg | daily | N/A | 1/12/18 | 2/12/18 | 230 | |
| DRUG D | 10mg | daily | N/A | 1/12/18 | 2/12/18 | 230 | |
| DRUG E | 10mg | daily | N/A | 1/12/18 | 2/12/18 | 230 | |
| DRUG F | 10mg | daily | N/A | 1/12/18 | 2/12/18 | 230 | |
| DRUG G | 10mg | daily | N/A | 1/12/18 | 2/12/18 | 230 | |
| DRUG H | 10mg | daily | N/A | 1/12/18 | 2/12/18 | 230 | |
| DRUG I | 10mg | daily | N/A | 1/12/18 | 2/12/18 | 230 | |
| DRUG J | 10mg | daily | N/A | 1/12/18 | 2/12/18 | 230 | |

FIG. 29

EXTRACTING STRUCTURED INFORMATION FROM A DOCUMENT CONTAINING FILLED FORM IMAGES

CROSS-REFERENCE TO RELATED APPLICATIONS

This application is claims the benefit of priority of U.S. patent application Ser. No. 16/192,028, filed Nov. 15, 2018, the specification, drawings and claims of which are incorporated herein in its entirety.

BACKGROUND

This invention relates generally to extracting textual content from an image and more specifically to extracting textual content from a filled form document.

In our daily life, we often have to provide official information to an institution, when declaring our taxes or filling in an administrative report. This information is often represented as a filled form document. Those documents can be stored in their original digital format or can be archived or transmitted as raster images, making it difficult for this information to be read by computer-based techniques. Adopting a manual human-based analysis approach to study those forms is both unfeasible and time consuming.

A filled form document or fillable form or just form is a document with fields, also referred as placeholders in which to write or select one of the proposed options. Forms are therefore a specific type of document whose content can be separated into two categories: a group of structural, standardized static content including questions created by the data collector and a group of variable answers located in predefined placeholders or fields that are entered by a data provider. Forms can be seen as a template in which a user will fill the placeholders with their personal data, or appropriate answers to any questions contained in the form. Most of the semantics content is therefore preserved from one filled form to another. In theory, the only changes are the answers written in the fields.

However, depending on the duration of the data collection process, the predefined set of questions or even the layout of the fillable form document might be modified. A modification may be because the data collection entity discovers at some point that data providers require more space to fill in information addressing a specific question, or that it would be beneficial to rephrase or reorganize questions in order to improve data collection. This is especially true for use cases that require constant monitoring or when data collection is integrated into a decision-making work flow Programmatic forms can be easily generated using annotation tools. A fillable PDF form is where the user can directly fill the answers in the form. All the answers are then automatically saved in an external file. By having access to the generated file, one has already all the information contained in the form, as well as the metadata of how answers relate to questions. However, when the original fillable was scanned and transformed into an image, all this information is lost and a complete pipeline has to be designed to retrieve the data.

One example of forms is scanned medical forms. Several entities are frequently involved to treat a patient, from the hospital to doctors. The forms are then often scanned and sent via emails or fax from an entity to another. To analyze at a large scale all the information contained in those scanned documents, a tool must be built to extract the content and then understand it.

One of the cases in which continuous data collection is required is the field of pharmacovigilance or drug safety. Adverse Events Reports (AER) are a standardized way of collecting information about potential health threats related to the use of a drug or other pharmaceutical product. In this case, the data collector can be a pharmaceutical company or public health administration which collects reports obtained from a variety of sources, including health professionals, patients and pharmacists, who fill in and transfer one of a set of predefined templates made available for this purpose.

Extracting information from AER documents can be challenging because of various reasons. On the one hand, the document transfer to the data collector is often performed by printing a copy of the filled report in paper and faxing or emailing a scanned version of it. These processes introduce loss and noise in the version finally obtained by the data collector. On the other hand, given the variety of sources involved, it is hard to guarantee the use of a common template that all parties agree upon. Furthermore, even if the template is fixed, there might be modifications introduced a long time (template versioning).

There is therefore a need for an automatic tool able to analyze scanned filled form documents.

SUMMARY

A novel system and method to analyze scanned forms, using visual computing features and machine learning techniques is disclosed. In this non-limiting example the present invention uses medical forms as a use case for the methods proposed. Using domain specific knowledge, the present invention takes advantage of the semantics.

The invention uses a two step-approach. In order, to provide consistent information extraction from filled forms, first the structure and the hierarchy from a blank, noise-free, form is learned. Second, using this structure and hierarchy also becomes an additional input for the filled form understanding.

In one example, the novel method begins with accessing an image of at least one page of a document with textual content. Next textual content from the image is extracted into a set of text lines and extracting a structural layout of the textual content from the image. A compositional hierarchy of the textual content and the structural layout is created. A form type is assigned to the image based on a compositional hierarchy of the textual content and the structural layout. In response to the form type being assigned to a known form type, vertical merging is performed to combine text lines in the set of text lines based on a relative position of the text lines. Text in the form type is matched to the set of text lines to identify a known set of text that includes a set of known textual questions and a set of textual answer candidates. Textual question to an answer candidate are determined from the set of known textual questions by a relative position of the textual question to the set of textual answer candidates. The form type is used to create a logical data structure of each textual answer.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention will be apparent from the following detailed description, taken in conjunction with the accompanying drawings in which:

FIG. 1 is a picture or image of an example Council for International Organizations of Medical Sciences (CIOMS) fillable form;

FIG. 2 is a picture or image of an example United States Food and Drug Administration (FDA) has a specific design for an AER fillable form;

FIG. 6 to FIG. 9 are a series of pictures of the form from FIG. 1 passing through the vertical line detection pipeline of FIG. 5;

Figure 10:
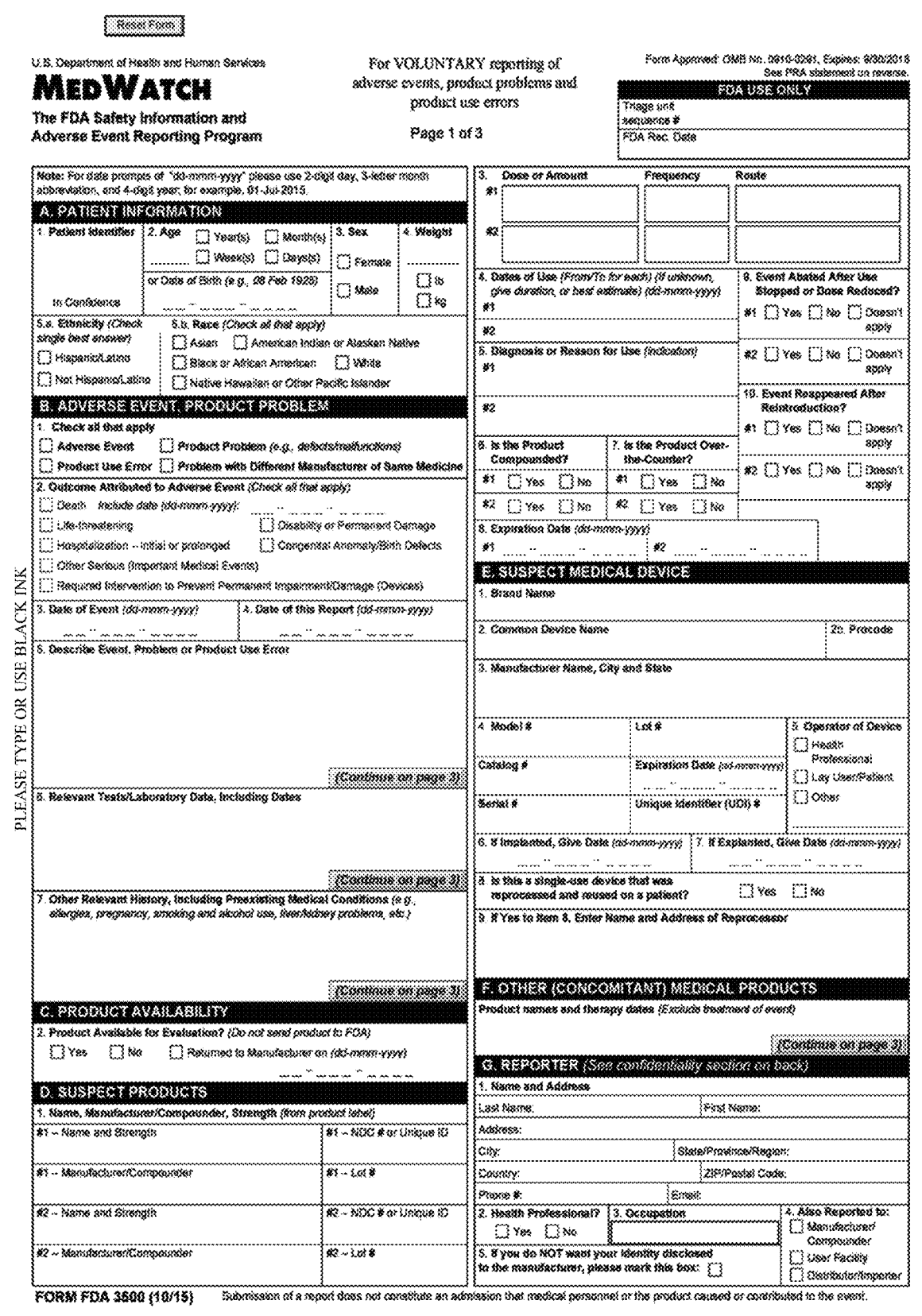

FIG. 10 to FIG. 13 are a series of pictures of the form from FIG. 1 passing through the vertical line detection pipeline of FIG. 5 and similar horizontal pipeline to provide a general structure of the form in FIG. 1;

Figure 16:
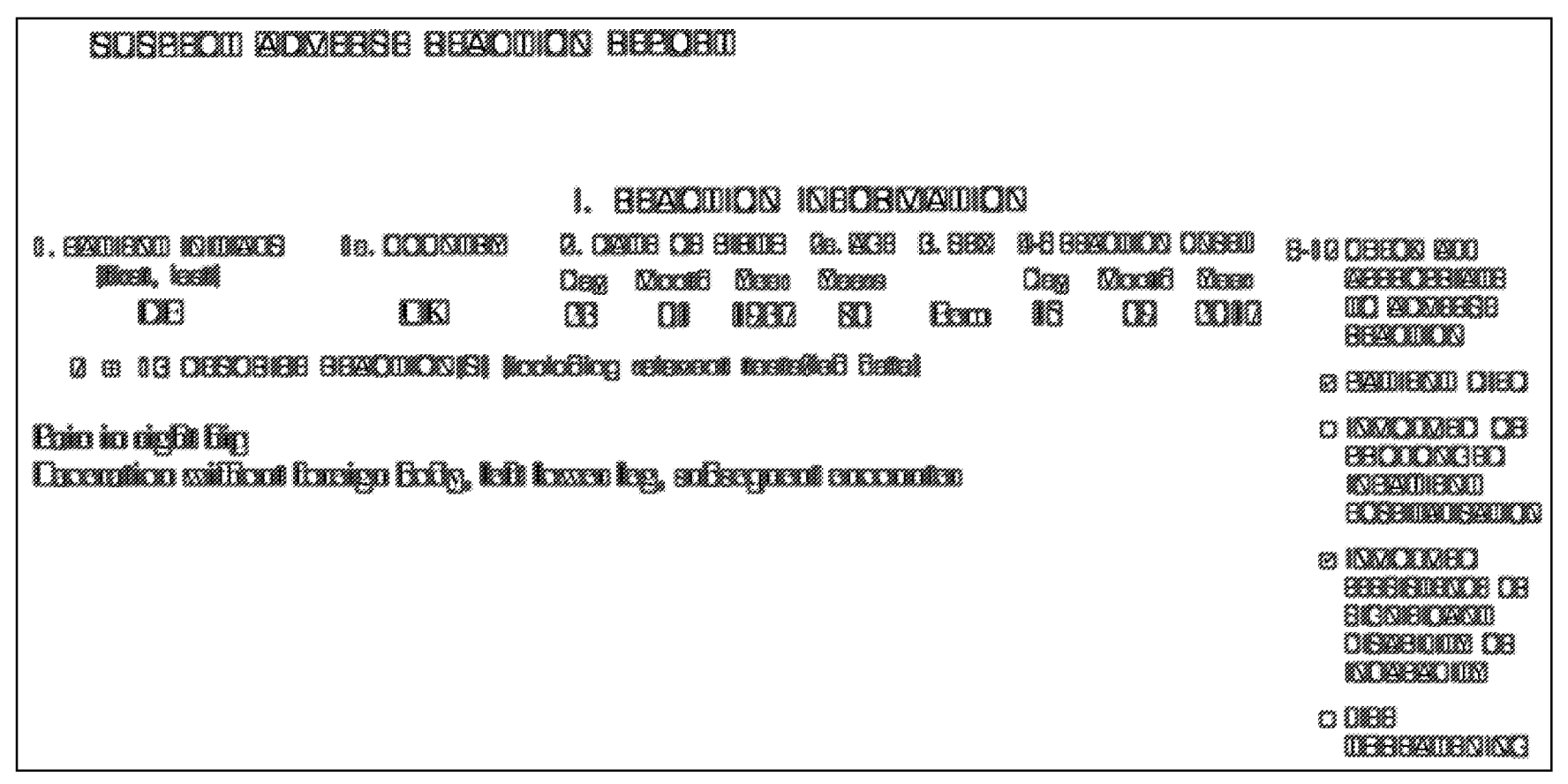

FIG. 15 to FIG. 18 are a series of pictures of the form from FIG. 1 passing through the region of interest pipeline of FIG. 14;

FIG. 19 is picture of a portion of the form from FIG. 1 and FIG. 20 is a picture of the FIG. 19 after region of interest calculation;

FIG. 21 are pictures representing the tickbox character in a fillable form;

FIG. 22 are pictures of fillable forms illustrating textual variability;

FIG. 23 are pictures of checkmarks from a scanned fillable form;

FIG. 27 is an example JSON file of the fillable form in FIG. 1 with the questions identified;

FIG. 28 is the JSON file after the process completes in FIG. 3 with the answers matched to the questions in the JSON file in FIG. 27;

FIG. 29 is a graphical user interface example showing a tabular answers that were matched using the overall flow of FIG. 3 for the fillable form document of FIG. 1;

DETAILED DESCRIPTION

Figure 3:
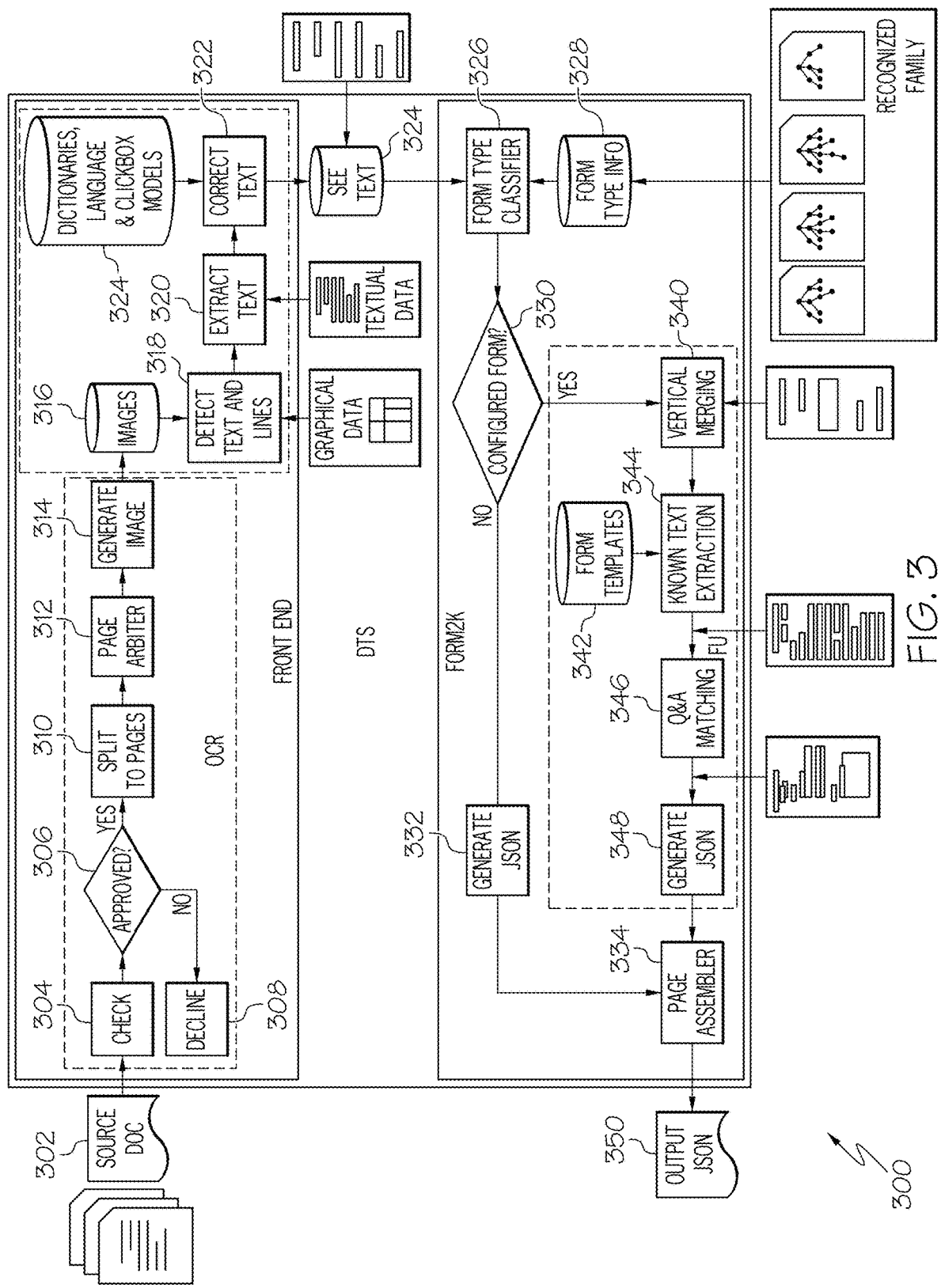
FIG. 3 is an overall flow diagram of extracting structured information from a document containing filled form images.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

While digitization of the content of document into a machine-readable format using optical character recognition (OCR) is the most obvious approach, most of the efforts done on OCR technologies do not aim a specific information extraction task, but on the other hand try to solve a problem in a completely domain and application independent way.

Document layout analysis tries to extract the contents of a document and restore its structure by analyzing the spatial arrangement of the contents. Applications on layout analysis range from text and non-text separation to full text segmentation of complex layouts.

Leaving page layout aside, the next task in extracting structured information from documents is table understanding. In this case, the goal is to retrieve the key(s)-value pairs that map headers from a table to the value represented by a cell. However the use of these methods cannot be extended to complex form layouts, since the tabular structure of tables is a quite rigid constraint that does not hold for forms.

The presently claimed invention uses complete form understanding (FU) which goes beyond these prior approaches, and extracts structured information in a semantically meaningful way so that, for instance, it can be stored in a database which can be used for data analysis.

The presently claimed invention provides a novel system and method for extracting content from filled form images. Unlike other system that focus on extracting the content either from programmatic or scanned documents. These other systems are limited in trying to understand the content in the scanned document. In contrast, the presently claimed invention, on top of extracting the textual content, goes on to semantically interprets the text in forms by a questions and answers matching algorithm.

The claimed invention first extracts textual information and the hierarchy in a blank form. This information is then used to extract and understand the content of filled forms. In this way, the system does not have to analyze from the beginning each filled form. The claimed invention is designed so that it remains as generic as possible. The number of hard coded rules in the whole pipeline was minimized to offer an adaptive solution able to address the largest number of forms, with various structures and typography. The system is created to be integrated as a built-in function in a larger pipeline. The Form Understanding (FU) pipeline could be the starting point of any advanced Natural Language Processing (NPL) application, where, for example, relations between drugs and symptoms are highlighted. Considering that the output is for most of the fields query-able through the entity type variable, computing statistics and building relationships between the entities become easier. The process is also able to handle multi-page documents as input with unclassified forms. This allows for large-scale analysis on substantial datasets. The output representation was designed such that it follows the hierarchy of the form while being abstract enough to represent all the forms, even the most complex ones. The claimed invention is flexible and each block is built on top of the other, each intermediate sub-section can be improved independently without influencing the rest of the overall pipeline.

Although the use case that described is specific to medical forms, the extensible solution that can be used in any other application, and will be especially beneficial in cases where multiple types of variability need to be addressed. Stated differently, the present invention is applicable to other forms in addition to medical forms.

Variability in Scanned Fillable Forms

Besides all the variability with OCR technique such as image skewing, cut off images, folded images and more. There is variability in the forms themselves. As previously discussed, AER forms are frequently used in pharmacovigilance to collect information about adverse events or reactions derived from the use of pharmaceutical products. Since the domain requires continuous monitoring form templates have been updated along the years. However, not all reporters will fill in data using an identical version of the template. This poses a major issue in form understanding, since growing variability needs to be addressed.

Form Families Variability

Figure 1:
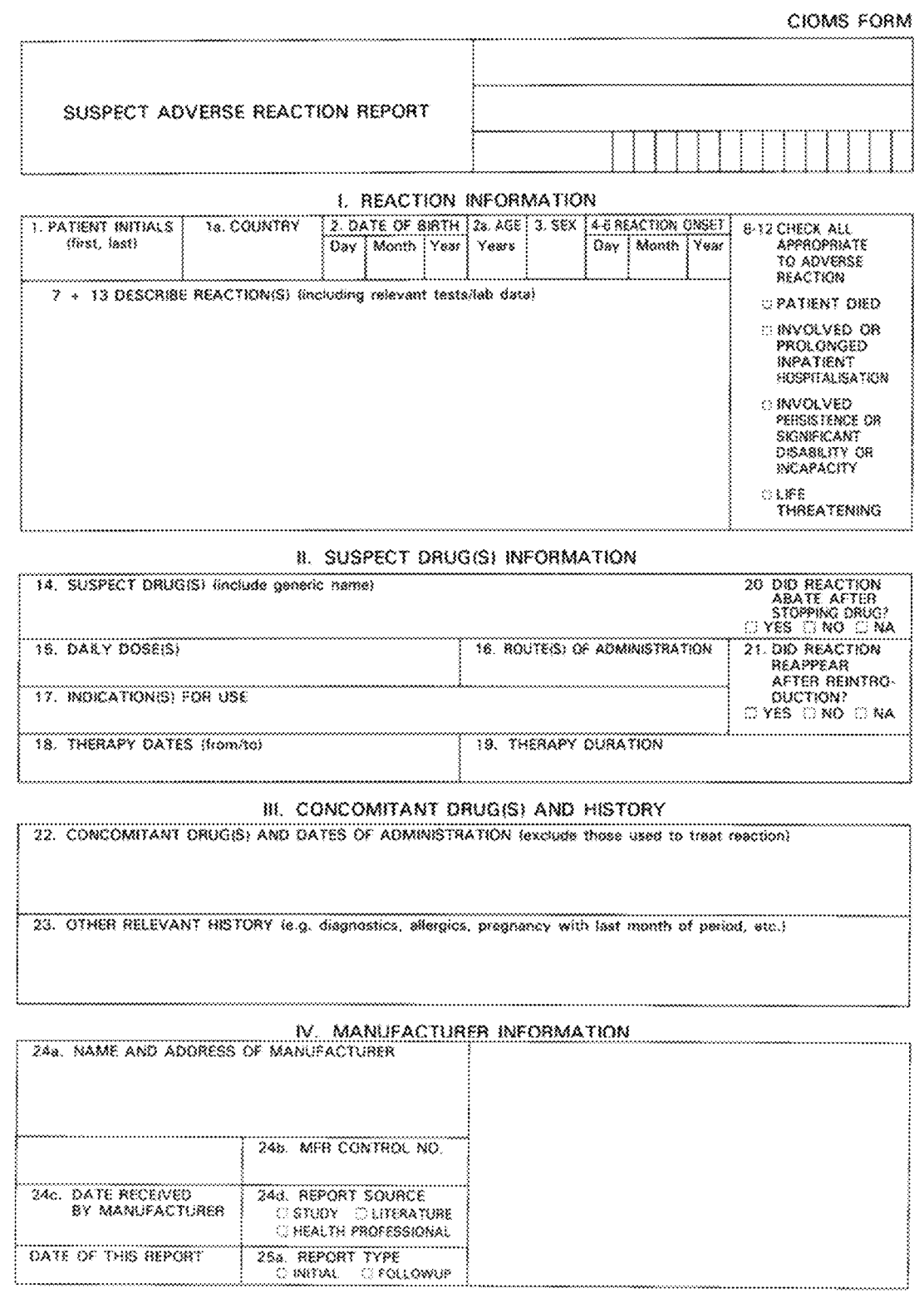
Figure 2:
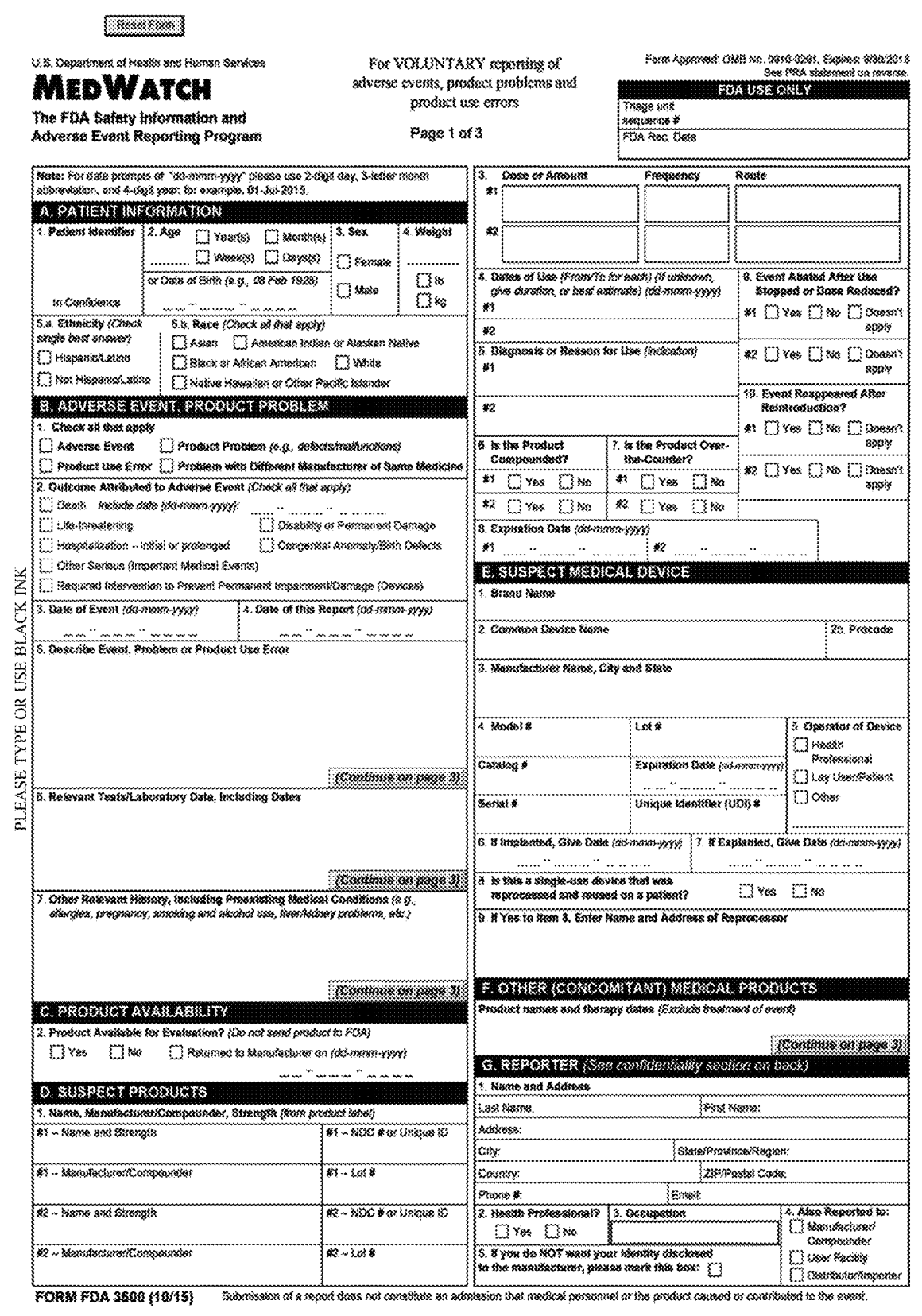

There are multiple levels of fillable form variability. The first level of variability is in form documents is the form family. This relates to the entity in charge of designing the data collection protocol and the associated document. For example, the United States Food and Drug Administration (FDA) has a specific design for a AER form (Medwatch form family) which is different to the Council for International Organizations of Medical Sciences (CIOMS) document for reporting adverse events (CIOMS form family). FIG. 1 is a picture or image of an example Council for International Organizations of Medical Sciences (CIOMS) fillable form and FIG. 2 is a picture or image of an example United States Food and Drug Administration (FDA) has a specific design for an AER fillable form.

Intra-Family Variability

The second level of variability in form documents is that not all forms from the same family are equally exhaustive (they do not contain the same set of questions). That is, some forms contain more options than others in a checkbox list. This can be due to an iterative process of refininig the data collection, e.g., follow-up reports contain specific fields that are not expected to appear in initial or final reports. Similarly, creating new versions of the form, even if the fields remain the same, also produces intra-family variability.

Intra-family variability creates uncertainty in form version recognition if only visual methods are used: changes might be not visually important but structurally important (e.g., addition of a new checkbox item in a list). In contrast, if every small change in a form can potentially be recognized as a completely separate entity, the impact would be on defining how the information is structured in each particular instance of a form document. This underlines the idea of having a content-based, location agnostic approach that on the one hand will be more flexible in the recognition of form instances, limiting the recognition to families rather than versions; and on the other hand, since it does not depend on locations but on content of the document, will be flexible in the identification of the fields actually present. FIG. 22 shows an example of intra-family variability. Notice that the text next to the checkboxes or tickboxes are not identical across the two forms but the overall content and questions all semantically very similar. This intra-family variability example is further described below. In this example dealing with "checking all that apply to adverse reaction."

Textual Variability

The finest-grain level of variability that can appear in AER forms is variability at the textual level. This refers to texts that are semantically equivalent but are phrased in a different way. For instance, in FIG. 22 there are matching pairs: patient died is semantically equivalent to results in death and indicate all appropriate to the adverse reaction is structurally equivalent to 8-12 seriousness criteria.

FIG. 22 the example of intra-family and textual variability. On left side there is one of the sections of a particular CIOMS form. On right side there is the corresponding section of another instance. Variability can show in terms of additional fields, fields located in different locations, or fields that are phrased differently.

Overall Flow of Extracting Structured Information

Initially, the Structural Element Extractor (SEE) module responsible for the text and structure extraction in the input document is described. Next described is how the process can from the blank form build a first understanding of the document and store it for the analysis of the filled forms. The next part will focus on how to go from a filled form to query-able knowledge with the help of the blank form. An emphasis will be made on the question and answer (Q&A) matching sub-section is described below. Insights on how the whole pipeline can be integrated into a larger, more complex architecture will also be given in the last part.

The Structural Elements Extractor (SEE) module was designed to extract the text of almost any type of scanned document so as its structure (i.e., the frame). The SEE is not restrained to form understanding (FU) and can also be used for the extraction of textual content from any pdf document, like plain text or emails. However, the system is optimized for text and structure extraction in medical forms. Other types of fillable form documents are within the true scope of the present invention.

The purpose of the SEE module is to extract all the textual content in the document as well as the structure if any as part of a data transcription service (DTS). The challenge in this crucial step is not only to extract the content but also to group the words that are close to each other from a topological point of view. All the text regions identified are gathered in a vector for further analysis. The claimed invention was designed such that one entry in the text region vector represents a text line in the input document.

The high-level pipeline is presented in FIG. 3. Each block is first generally described and then described in detail. This pipeline in FIG. 3 is designed such that it can be used as a built-in block to facilitate the integration in a larger architecture.

FIG. 3 is an overall flow 300 of extracting structured information from a document containing filled form images. The flow begins at step 302 in which form filled documents, such as those shown in FIG. 1 and FIG. 2, in which answers (not shown) are entered to the questions and are scanned into a system. A test is made in step 304 to see if the file extensions or type of document is supported by the system. Typical scan image or pictures are file extensions JPG, BMP, TIFF, PDF, PNG and others. If the image type is supported in step 306, the process continues to step 310 otherwise the image format is not supported and the image is declined in step 308. In response to the image type being supported the process continues to step 310 in which a multipage document is broken into individual pages and checked with a page arbiter 312 to ensure accuracy. Finally the generated images for each filled form page are stored in steps 314 and 316.

Graphical lines or graphical data is extracted in step 318. This is further described below. The text is extracted in step 320 using textual bounding box as described below. Text is corrected in step 322 through use of dictionaries, natural language processing (not shown) and tickbox models 324. The tickbox model is described further below. The text and graphical lines for each filled form document that have been preprocessed and corrected. A compositional hierarchy of the textual content and the structural layout is created. This compositional hierarchy is shown in FIG. 27 and further described below.

For each page stored in the output JSON file, a set of information is stored as presented below. These information can be used for other modules after the FU process.

Each page content is characterized by its size (width, height), the input format type (pdf, jpg, and png), the total number of pages in the document and the current page number. Finally, if a form was identified, its type (CIOMS, FDA-3500 etc.) is stored.

In step 326 the system accesses the textual content from the image into a set of text lines and extracting a structural layout of the textual content from the image. Form types information 328 is used to determine if the system recognizes the fillable form type. The form type is assigned to the image based on a compositional hierarchy of the textual content and the structural layout.

Information on how the form type is determined is further described below. In the event the form type is not recognized, the form may be configured in steps 330, 332, 334 to generate a JSON file 350 as shown in FIG. 27. In response to the form type being assigned to a known form type, a vertical merging step 340 is performed to combine text lines in the set of text lines based on a relative position of the text lines. This vertical merging is further describe below.

The process continues in step 344 in which a known set of text is matched. The text in the form type is matched with the set of lines extracted to identify the known set of text. The known set of text includes both textual questions and a set of textual answer candidates and may include other know text such as headers, instructions, sections and subsections of the original document. Form templates 342 may be used as part of the know text extraction. This is further described below.

Next in step 346, question and answer matching (Q&A) is performed. This Q&A matching is in response to the form type being assigned to a known form type, a vertical merging is performed to combine text lines in the set of text lines based on a relative position of the text lines. The Q&A matching is further described below.

The process continues to step 348 in which the JSON file or other logical data structure is generated for each textual answer and pages assembled in step 348 to the output JSON file as shown in FIG. 28.

Textual Bounding Box with JSON file

Figure 4:
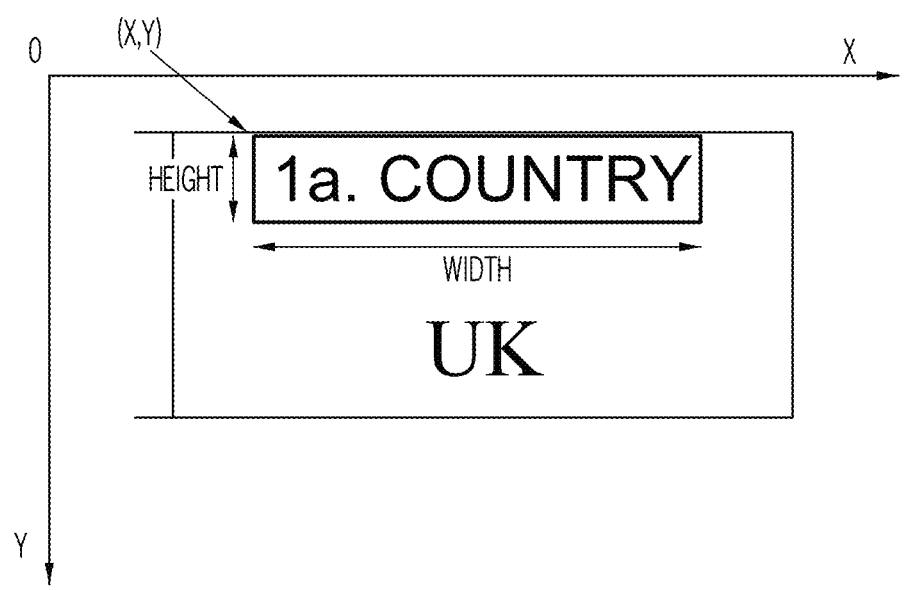
FIG. 4 is an example of a text line with a bounding box annotation along with the output content in a JSON file type format.

As shown by FIG. 3, the SEE outputs first a set of text regions as in FIG. 4. More specifically, FIG. 4 is an example of a text line with a bounding box annotation along with the output content in a JSON type format. All the information is grouped in a JSON file. The content of each text region is as follows:

Text: the content of the string extracted

Bounding box: represents the location of the text line in the form. The two first element represents the x, y coordinates of the top-left corner of the bounding box. The third parameter indicates the width and finally the fourth the height of the bounding box. The origin of the axis is assumed to be the top-left corner of the image.

Confidence: gives an indication of how robust is the detection. The OCR directly provides the confidence level as a number ranging 0 to 100. Experience shows that a confidence above 85 can be considered as high.

In addition to all the text regions, the output stores the image size (width and height), the execution time and the format of the input image.

The Structural Elements Extractor (SEE) module also outputs the structure of the form by extracting the lines. The lines are stored in the shape of a mask with the same size as the input image.

Line Detection

As presented before, in most of the forms, the content is structured using boxes and lines. To extract precisely this structure is an essential step in the SEE module to ensure a correct clustering of all the semantics elements. The proposed pipeline relies on morphological operations and wavelet decom-position of the input image to extract accurately horizontal and vertical lines separately. Detecting horizontal and vertical lines in two passes allows for higher robustness and more freedom in the next steps. On top of the straight line detection, the sub-section extracts the variations from one background color to another one. In fact, many forms are using different background colors to highlight the sections. Those implicit lines contain a lot of information on the general structure and must be also extracted for a comprehensive understanding of the form. Some examples are presented in FIG. 5 which is a flow diagram of vertical line detection pipeline of FIG. 3.

The lines are represented as a mask with the same size as the image. A black pixel represents the background of the image and a white pixel a line. This representation allows for fast logical operations (pixel to pixel operation) between the binarized input image and the mask. The masks representing the vertical and horizontal lines can then be combined to represent the overall structure of the form.

The line detection sub-section presented below is used to extract the vertical lines. The horizontal lines are extracted by following a similar approach.

Figure 5:
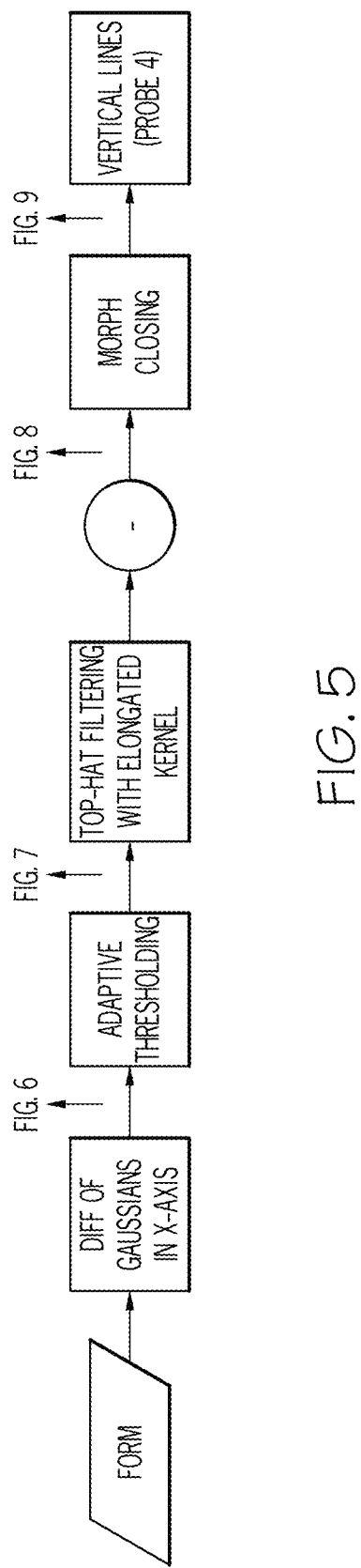
FIG. 5 is a flow diagram of vertical line detection pipeline of FIG. 3.
Figure 6:
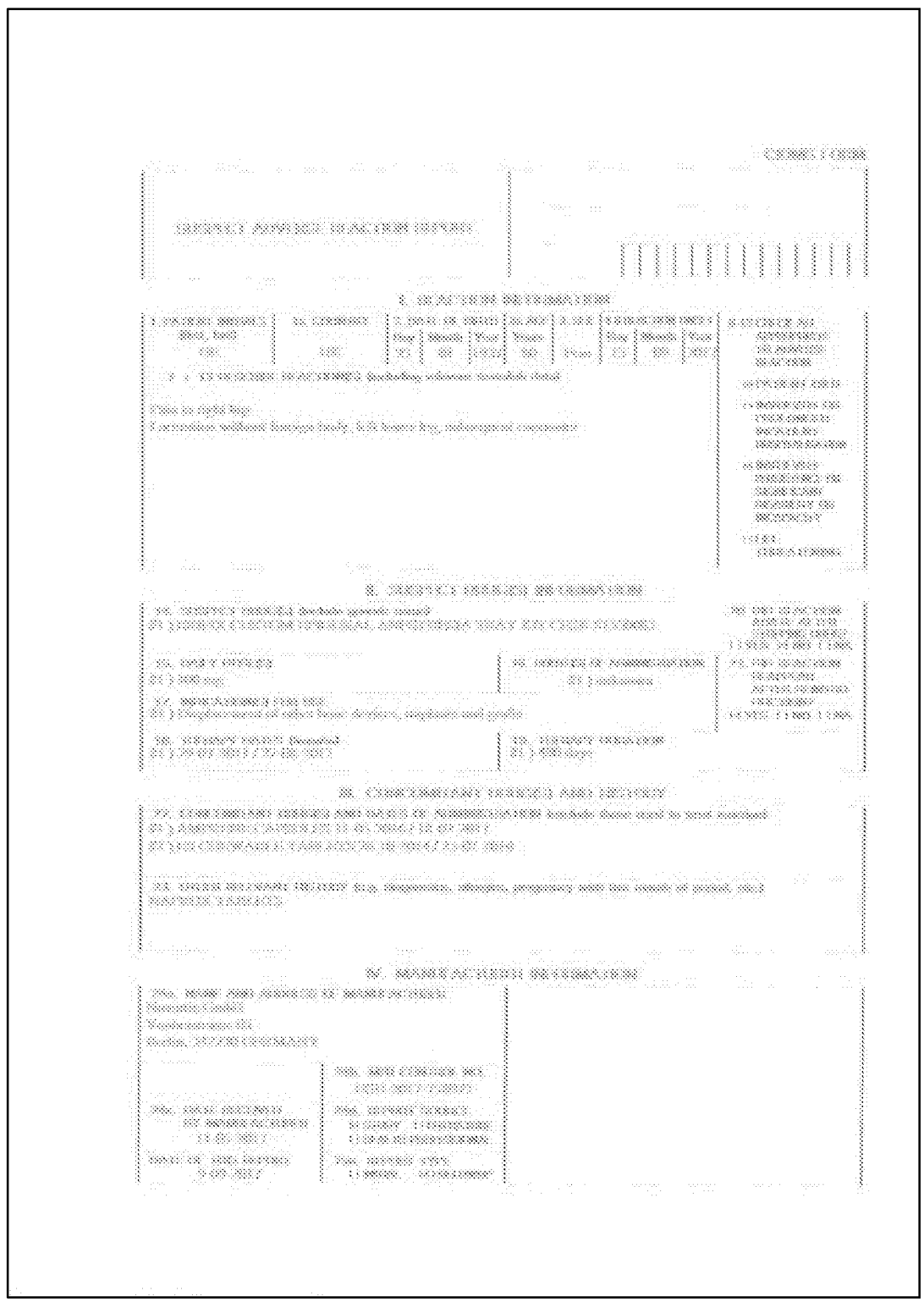
Figure 7:
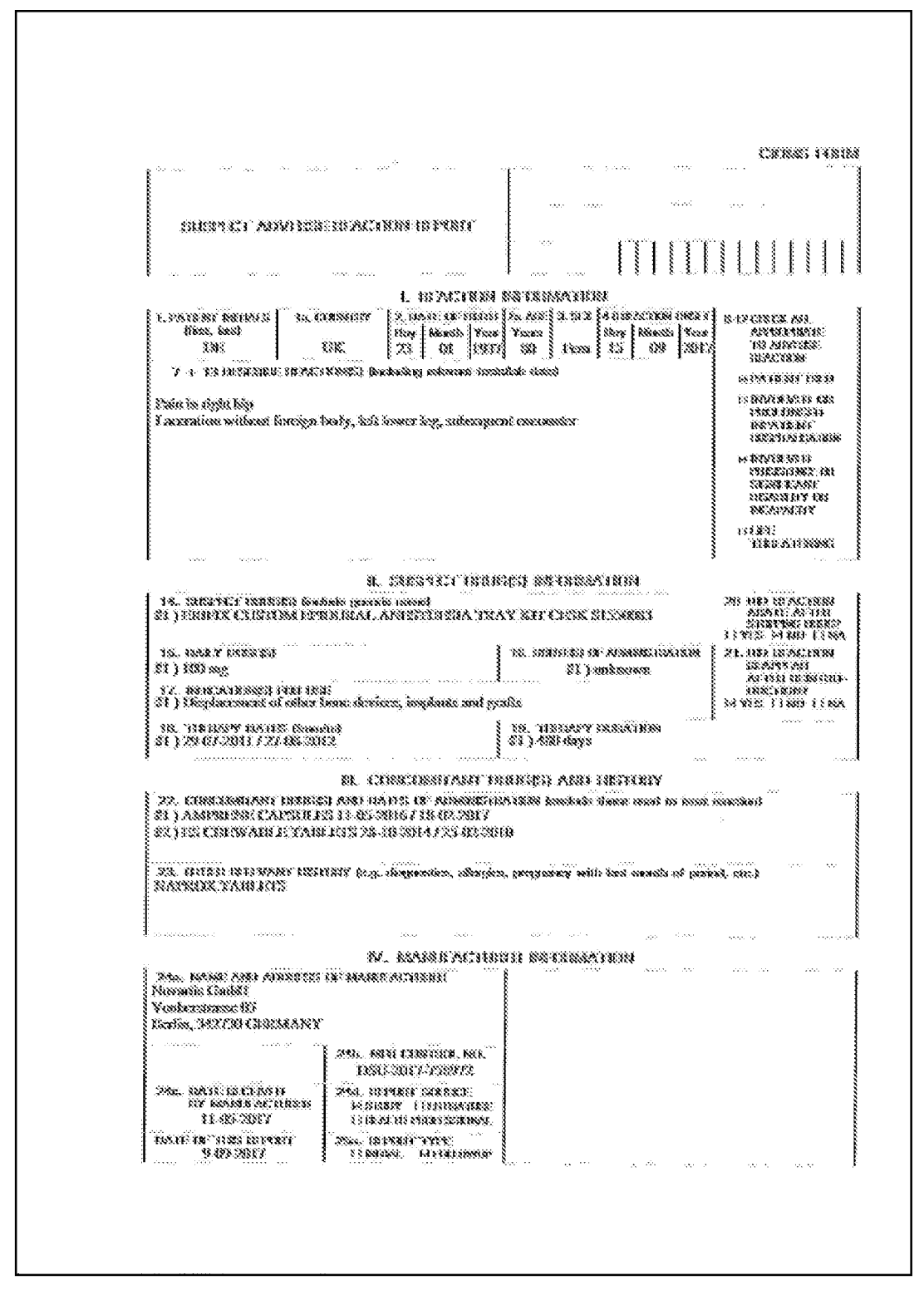

The full pipeline is schematized in FIG. 5. Vertical lines are characterized by very high variations according to the x-axis. With this in mind, the high-frequency components are extracted from the image. This process is achieved by analyzing the image in a separable framework. A difference of Gaussians (DoG) as an approximation of the Laplacian of Gaussians, which is obtained when the ratio of the sigmas in the DoG is approximately 1.6. This output image is shown in FIG. 6. The DoG highlights edges of widths which vary according to the wavelet scale, being the highest frequency bands contain the sharpest, thinner edges. An adaptive thresholding is used to keep only the pixels with high response to the wavelet filter. This output image after the adaptive thresholding is shown in FIG. 7.

However, the output is still noisy and all the small characters must be removed. A top hat filtering is performed to create a temporary image where all the vertical elongated elements (i.e., the lines) are removed. A top hat filtering is a morphological operation derived from the opening transformation. It is defined as the difference between an input image f and its opening by a structuring element b (see Eq. (1))

$$T(f) = f - f \circ b \tag{1}$$

Figure 8:
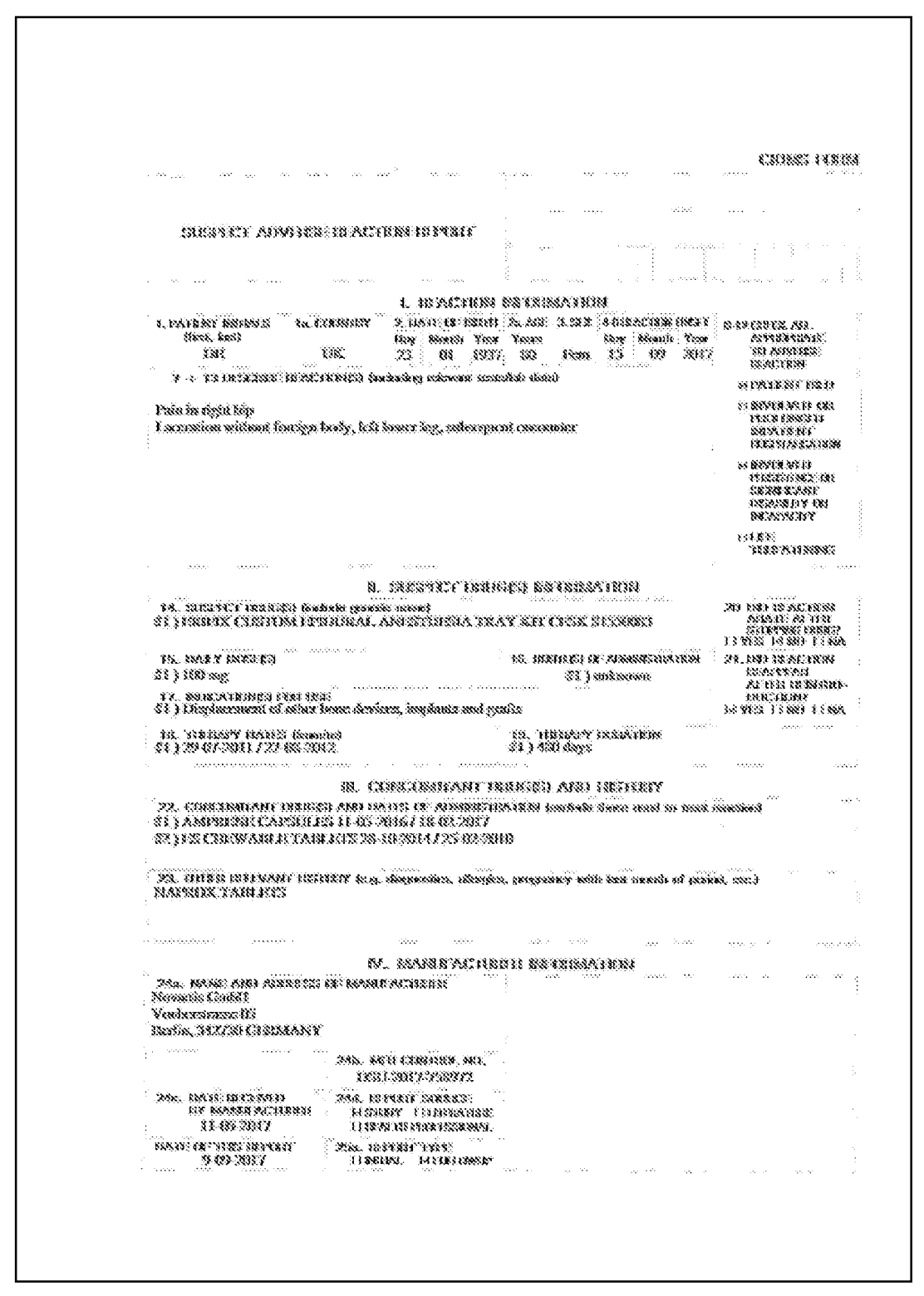
Figure 9:
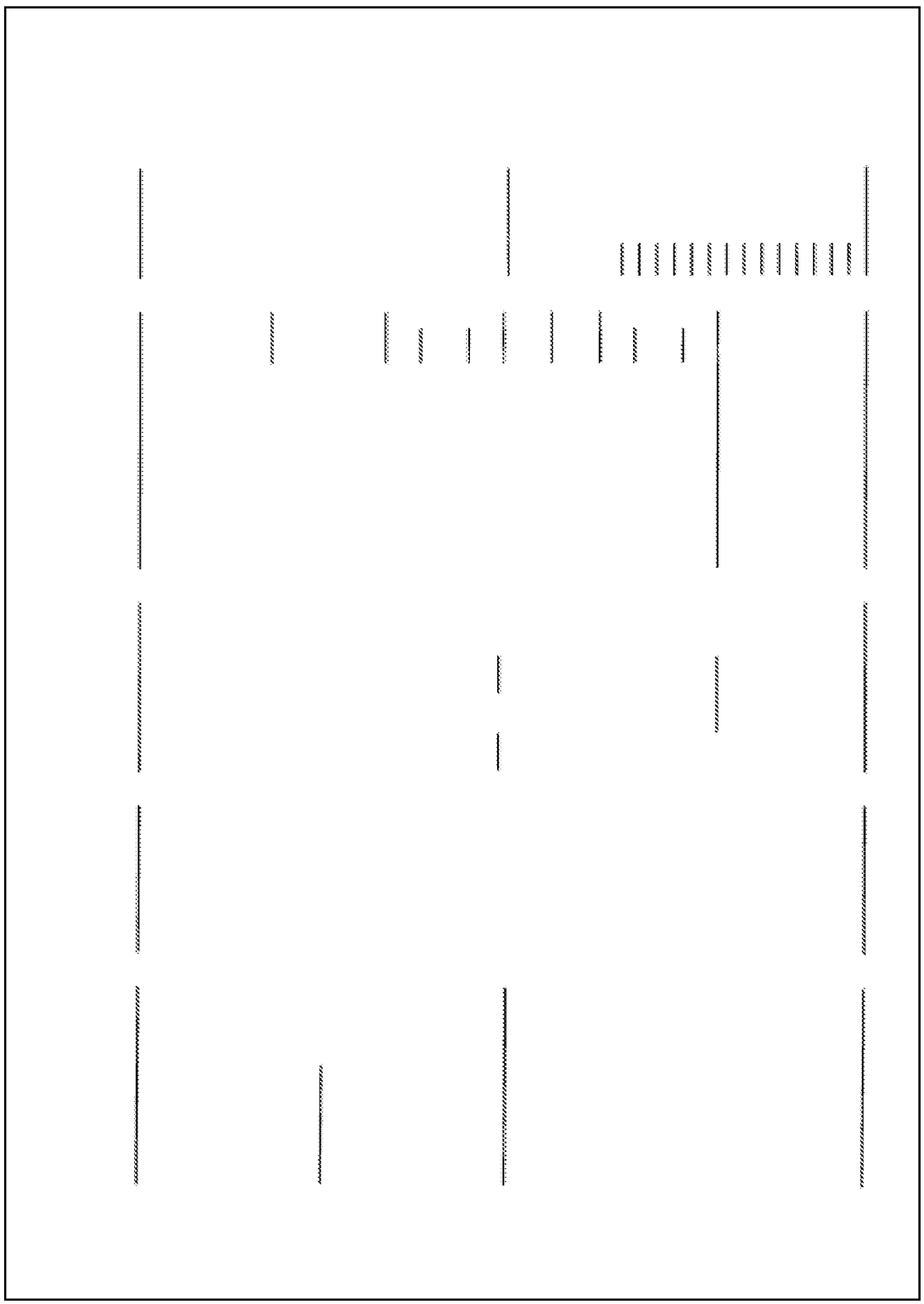
Figure 11:
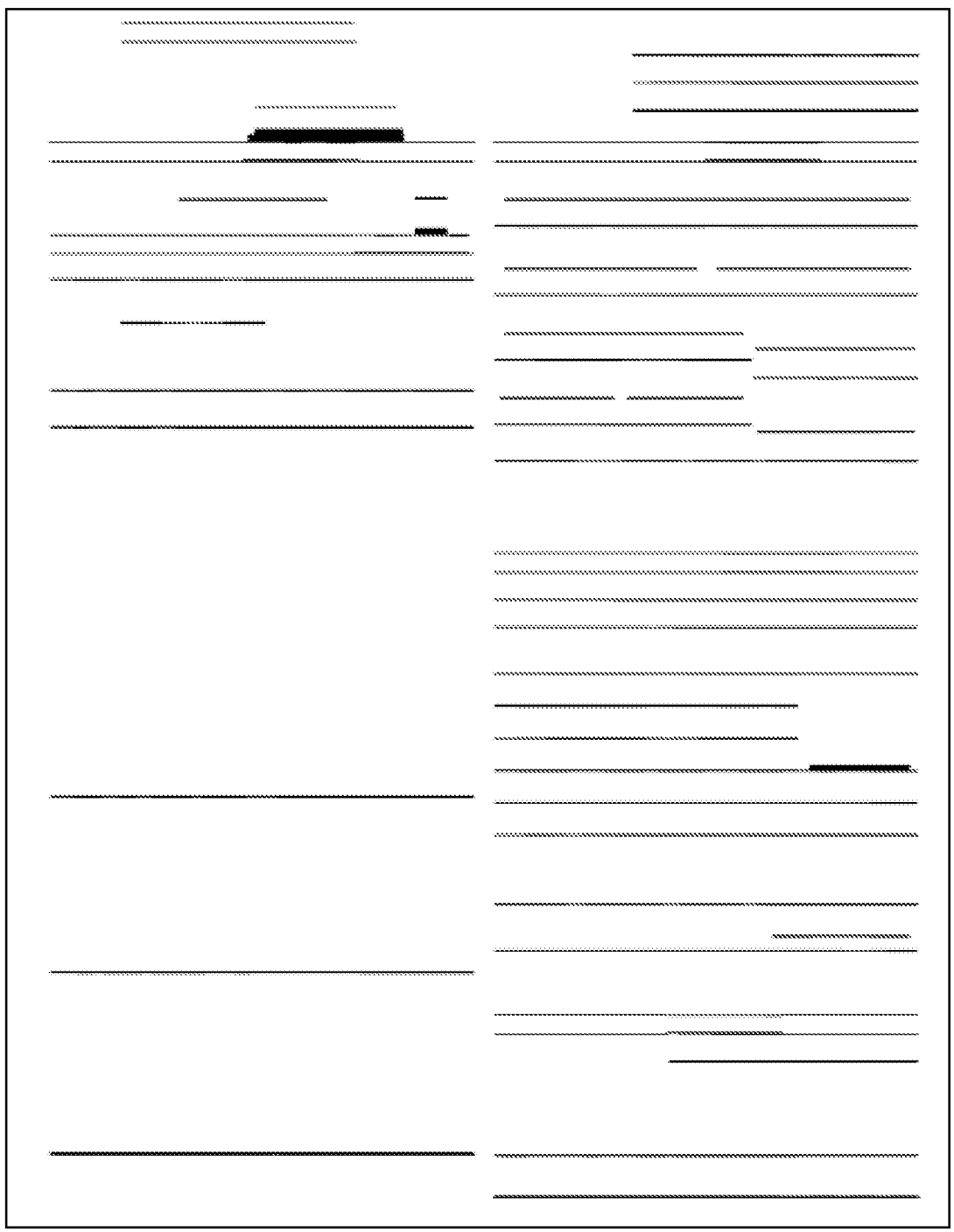
Figure 12:
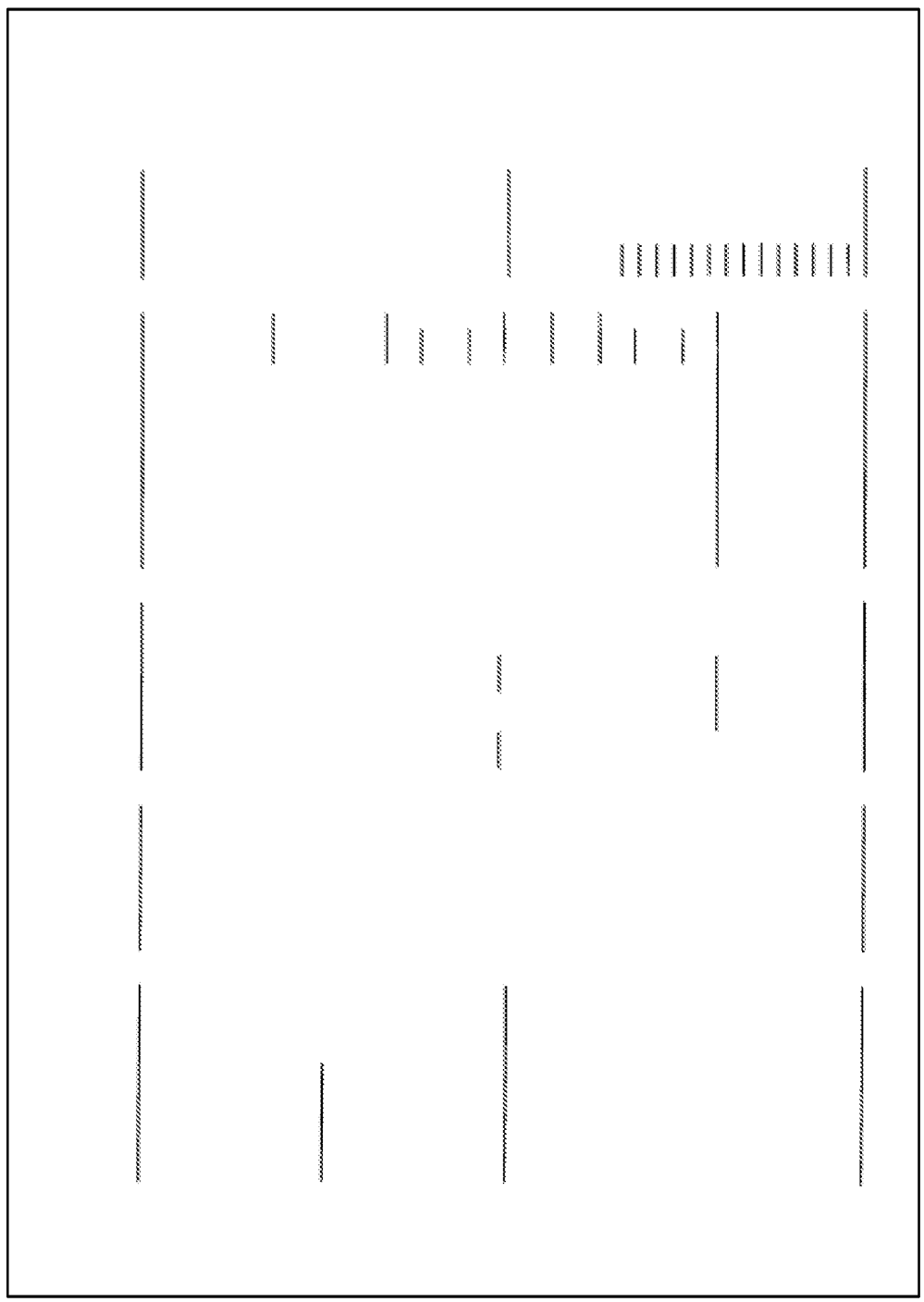

The output of this operation will keep all the elements smaller than the structuring element and brighter than their surroundings. The vertical lines are filtered by setting the kernel to a size close to the average size of two characters. The output of the top hat filtering is shown in FIG. 8. The lines are then obtained by taking the difference between the output of the adaptive thresholding and the top hat filtering. To clean the output and ensure a smooth result, a closing transformation is finally applied as shown in FIG. 9.

The horizontal lines are extracted by following a similar process. The variations along the y-axis are compute of the x-axis (i.e., apply a difference of Gaussians along the y-axis).

Figure 13:
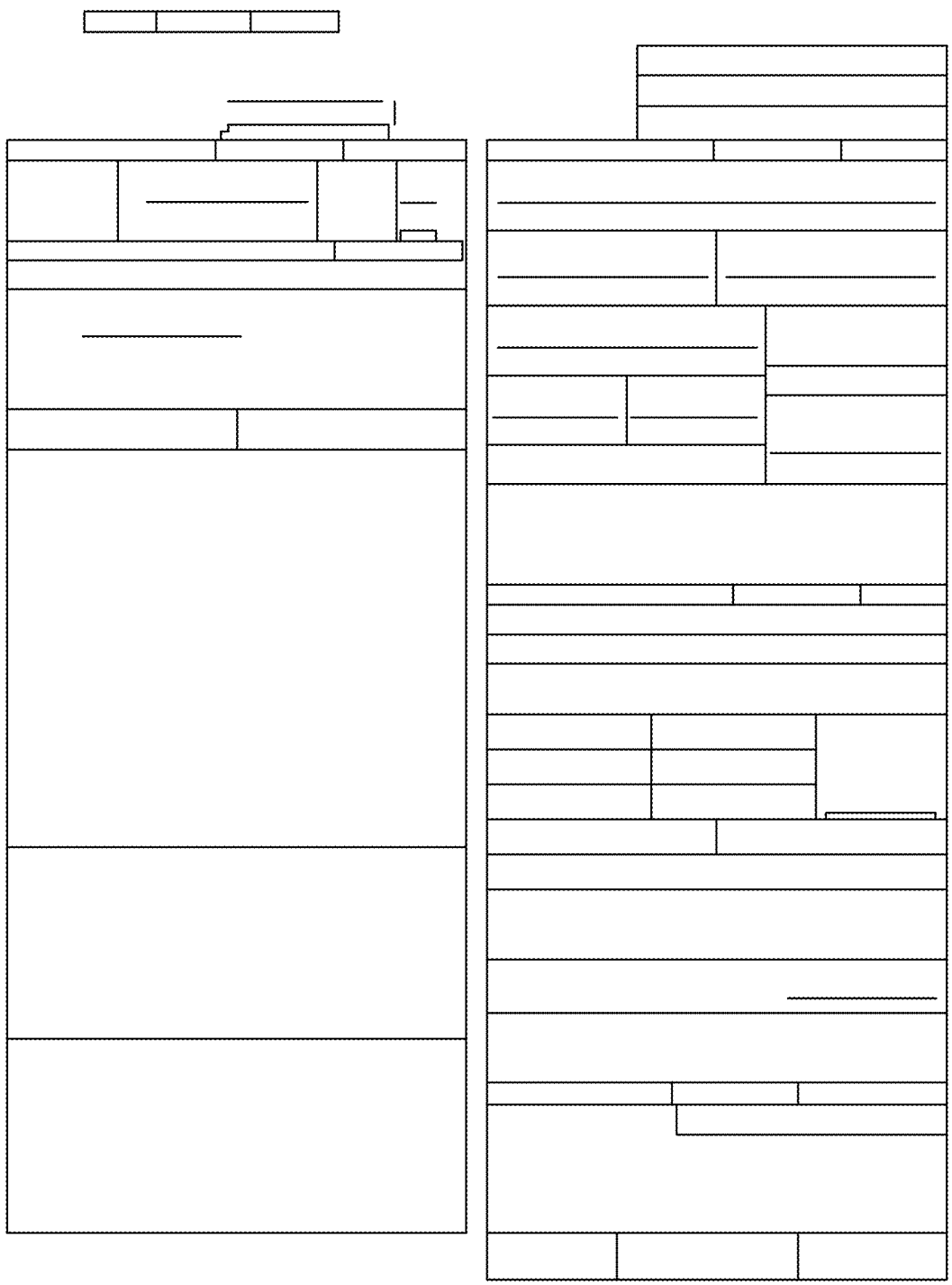

A thresholding on the input image followed by a top hat filtering should be able to extract most of the lines but will fail at highlighting the implicit lines (i.e., changes in the background). An example is given in FIG. 10 where the text is written in white over a black background for the sections and in black over a white background for the rest. More specifically, FIG. 10 to FIG. 13 are a series of pictures of the form from FIG. 1 passing through the vertical line detection pipeline of FIG. 5 and similar horizontal pipeline to provide a general structure of the form in FIG. 1. As shown in FIG. 13, the original black patches were replaced by sharp lines making the structure understanding of the form more robust.

Region of Interest Extraction

This program module extracts Regions of Interests (RoIs) from the form. A RoI represents a text region or a group of words close to each other. The sub-section assumes that a group of words close topologically speaking are also close semantically speaking. This assumption is usually respected in forms where each field is separated by a blank space or by a line with the next one. Each RoI will then be fed to the OCR for content extraction. A text region corresponds to maximum one full line of text, even if it would make sense to merge it with the line at its bottom. In this way, the OCR analyses only one text line at the time. It has the advantages to first speed up the OCR computational time compared to the case where the OCR analyzes words one-by-one. It also allows the OCR to perform semantics linkages from one word to another. Finally, if a full paragraph is set as the input of the OCR with text to the left not aligned (often the case between a question a the answer), the OCR has some difficulties to recognize the first word. The above-listed issues justify the adoption of a line-by-line text extraction. Some explanations on how the text regions can be merged vertically to create paragraphs of text are given below.

Figure 14:
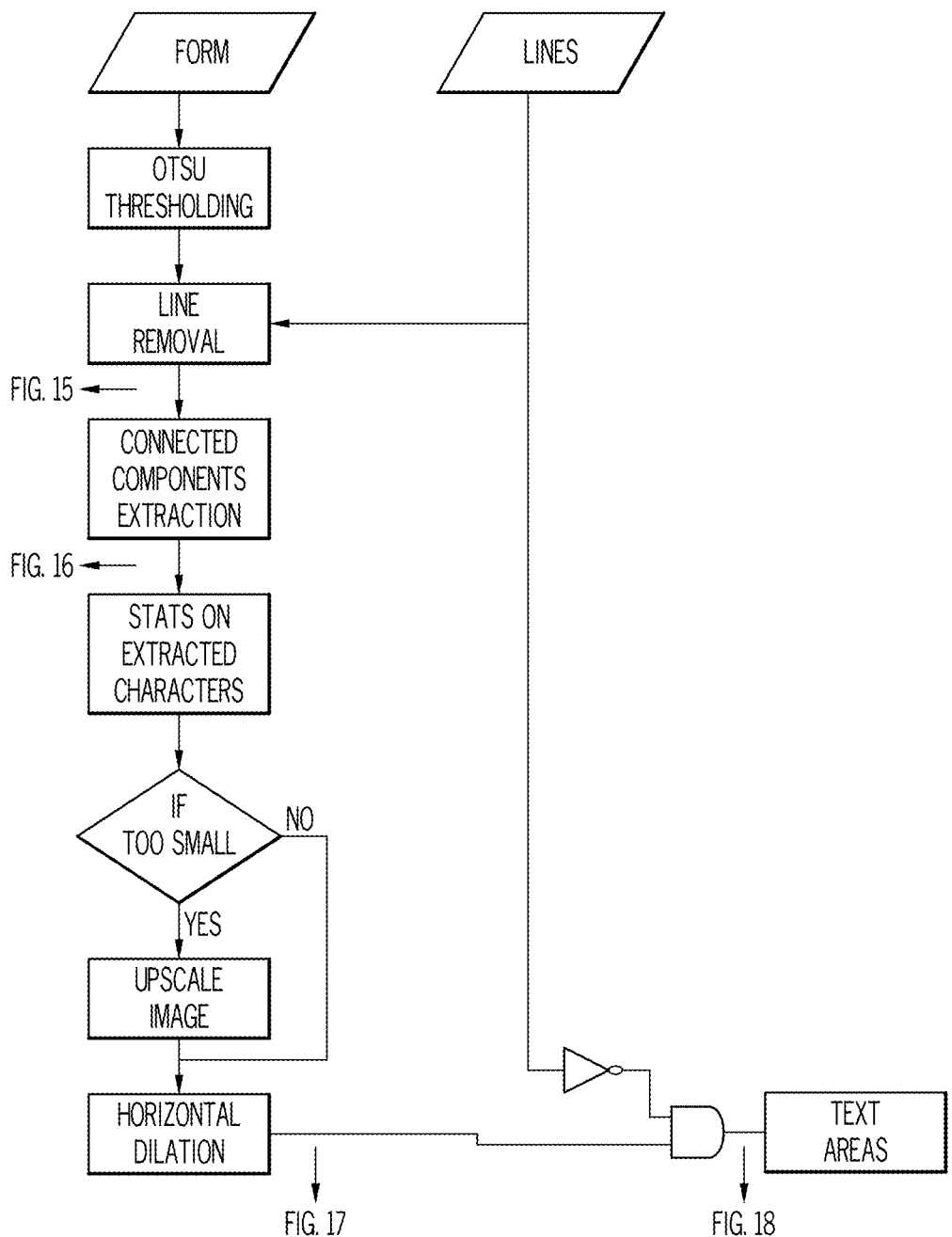
FIG. 14 is a flow diagram of a region of interest pipeline of FIG. 3.

The RoI extraction pipeline flow diagram is presented in FIG. 14. Some step-by-step explanations will be given to go from an input form to a set of text regions ready to be sent to the OCR module. The lines computed as described in the overall flow of FIG. 3.

The first step when an input form (often a grayscale image or eventually an RGB image) is sent to the RoI extraction is to binarize or threshold it. This step transforms the image with pixels ranging from [0, 255] to a 2-levels representation with only black or white pixels. In one example the presently claimed invention uses a method such as that taught by Nobuyuki Otsu. A Threshold Selection Method from Gray-Level Histograms, IEEE Transactions On Systems, Man, And Cybernetics, Vol. SMC-9, NO. 1, January 1979, (herein after "Otsu") the teachings of which are hereby incorporated by reference in its entirety. Other thresholding techniques are within the scope of the present invention. This Otsu thresholding technique assumes that the image contains two classes of pixels following bi-modal histogram (foreground pixels and background pixels). The optimum threshold separating the two classes is then determined so that their intra-class variance is minimal. More formally, denote as L the number of grayscale levels in the image and k the level separating class 0 and class 1 (i.e. all pixels between [0, k] are classified as class 0 and all pixels between [k+1, L] as class 1). Construct, pi=niN the probability for a pixel to be at level i calculated as the number of pixels at level i in the image over the total number of pixels. Finally, w0 =Pr(CO) and w1=Pr(C1), the probability of belonging to class 0 and 1 respectively. The optimal threshold is given by the level k that maximizes the cost function λ given by Eq. (2).

$$\lambda = \frac{w_0 w_1 (\mu_0 - \mu_1)^2}{w_0 \sigma_0^2 + w_1 \sigma_1^2} \qquad (2)$$

where μ0 and μ1 are the average level of class 0 and class 1 respectively and where $$\sigma_0^2 = \sum_{i=1}^{k} \frac{(i-\mu_0)p_i}{w_0} \text{ and. } \sigma_1^2 = \sum_{i=k+1}^{L} \frac{(i-\mu_1)p_i}{w_1}$$

In other words, the threshold that will maximizes the difference of the mean of the two classes (term w0w1 (μ0–μ1)² in Eq. (2)) and minimizes the variance within class 1 (term $\sigma_1^2$) and class 2 (term $\sigma_2^2$) is desired.

This method has the advantage to adapt the global structure of the image. Indeed, the expectation in scanned documents is to observe the same background color in the entire page. However, this image will often be noisy, with for instance a light gray background. With Otsu thresholding, this level will be identified in the form and will be set as one of the two levels. A similar reasoning can be made for the characters often written in black but that can become dark gray with bad scan images.

Once the input is filter by threshold, the next step is to remove all the lines from the image. Using this approach, the input cropped image sent to the OCR is cleaner, and remaining lines will not create noise (for instance a line identified as a capital "I"). This operation can be done efficiently using Boolean algebra. The vertical and horizontal lines extracted in the as described in the overall flow of FIG. 3 are combined together to create a new mask. As a reminder, in this mask, the lines are in white (level 1) and the background in black (level 0). The filtered image follows the same rule (content in white and background in black). The logical operation presented in Eq. (3) is applied to replace all the white lines by black pixels.

$$O = I \wedge (!M) \qquad (3)$$

where O denotes the output image, I the input image and M the mask. Λ denotes a logical AND gate and ! the NOT operator.

FIG. 15 to FIG. 18 are a series of pictures of the form from FIG. 1 passing through the region of interest pipeline of FIG. 14. A zoom of the image at this stage is shown in FIG. 15. All the lines were removed and the characters are clearly visible.

The next step is to extract all the connected components in the image (i.e., the bounding box of each component). All the remaining components are either characters or noise. This noise is essentially small connected components, like Salt & Pepper noise. This is discarded by removing all the connected components smaller than (2×2) pixels (see FIG. 16). Some statistics are then computed on all the remaining components like their average and median width and height. Those statistics indicate the approximate font size used in the form. If most of the characters are too small, the OCR will not be able to extract them correctly. A decision is, therefore taken to upscale the image such that all the components have a width or height greater than 20 pixels. Twenty pixels correspond to the limit size to ensure accurate results from the OCR. The image is resized if required using a cubic interpolation to optimize the rendering.

Figure 17:
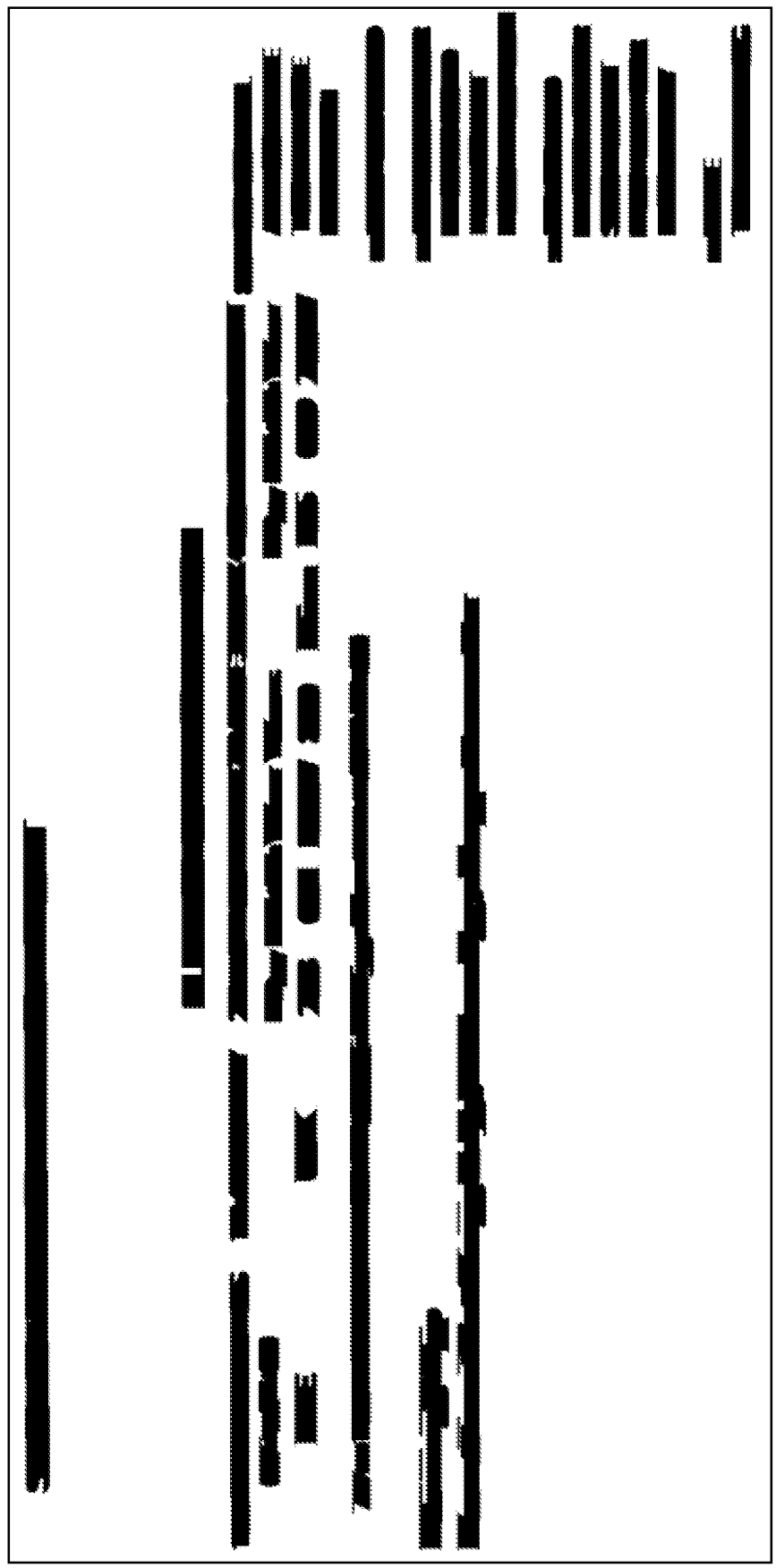

At this stage, the image should be optimized for OCR. The next steps will extract the RoIs. Morphological dilation is applied to all the connected components extracted. The structuring element is set to three times the average character width in the x direction and one in the y direction (neutral operation). In this way, all the close characters will be merged horizontally but not vertically. This process is illustrated in FIG. 17, where distinct white patches highlight the Region of Interests.

Figure 18:
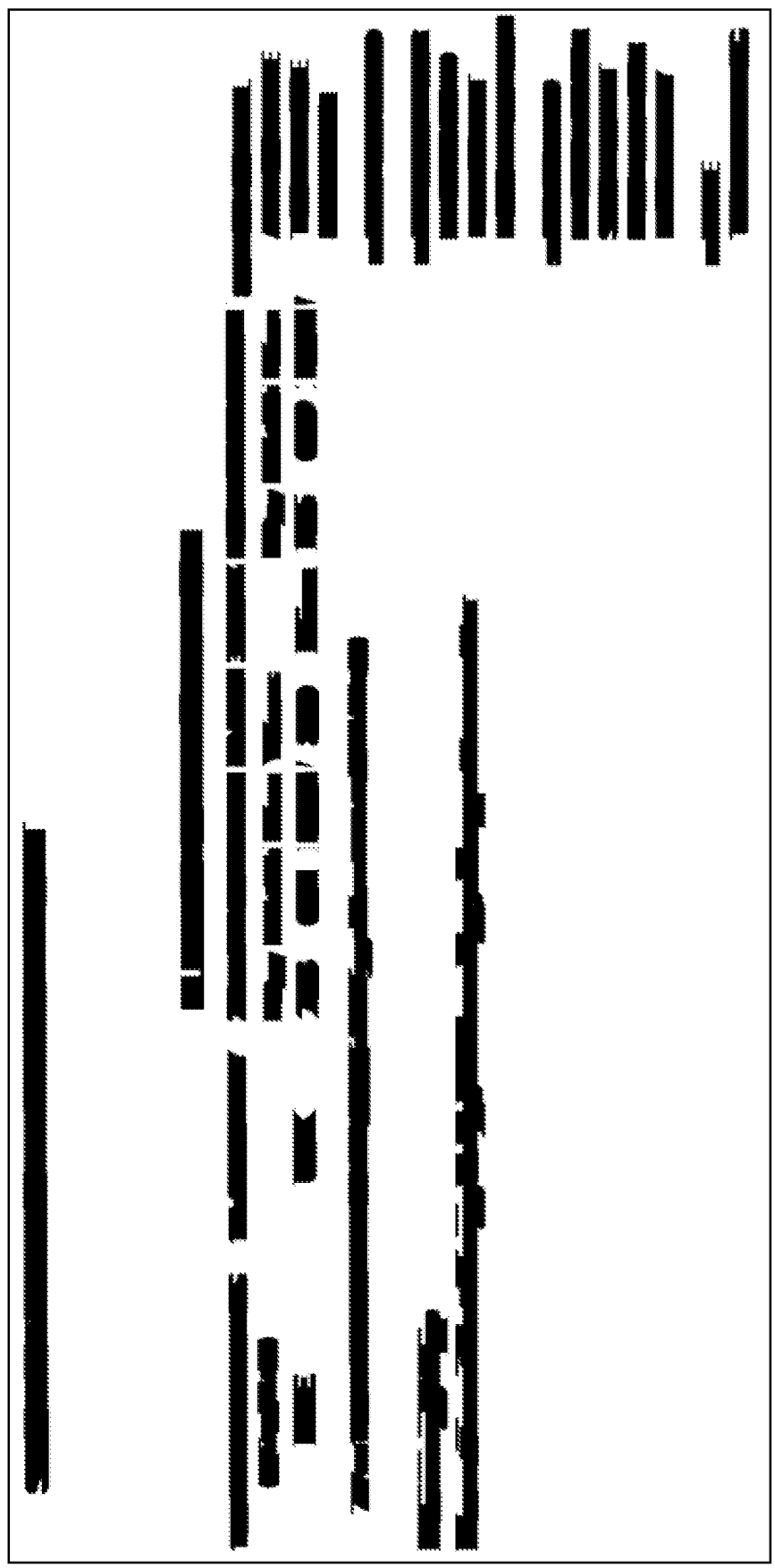

As said before, in fillable form documents, the fields are usually separated by either a blank space (condition respected by the dilation if the distance separating two fields is larger than three characters) or by a line. Therefore another logic operation is performed on all the pixels of the blob image to create a separation when a line is cutting into two pieces a white patch. The logical operation that performs this task is the same as the one presented before to remove the lines. Therefore the blob image is sent to an AND gate with the NOT operator of the mask representing the lines. The output blob image is shown in FIG. 18.

To obtain the bounding box of each RoI identified, the concept of connected components is used. The coordinates of each element will, therefore, give the coordinate of a region of interest. An example starting from the original input image (grayscale image) to all the RoIs is shown in FIG. 20 and FIG. 19 being a portion of the original photograph of form from FIG. 1.

This process has the advantage to robustly remove the noise from the original image while being efficient from a computational point of view. Indeed, logical operations even on large images are fast as they require only (h×w) operations where h and w are the height and the width of the image.

Unicode Character Detection and Tickbox Detection

The list of characters that some OCR software is able to detect is limited to ASCII characters, as presented as follow.

the Unicode standard as shown in FIG. 21. Specifically: (a) Unicode+2610 (b) Unicode+2611 (c) Unicode+2612 and (d) Unicode+25A3.

As explained previously, the blank fillable form is first analyzed to identify and extract the hierarchy. In the blank fillable form, the tickbox classification is simplified to a two class-problem as ticked checkboxes are not expected in a blank document. The classifier is, therefore, an empty checkbox vs rest (mostly regular characters) problem.

However, when analyzing a filled form, the problem moves to a three class-problem, empty checkbox vs. ticked checkbox vs. rest.

With this background two versions of the classifier are generated: one when analyzing blank form and the other version when analyzing filled forms.

The approach used to identify tickboxes in the form. However, a similar sub-section can be extended to detect any special character and is application dependent. For instance, another version of the SEE could be optimized to extract text from financial tables where the non-ASCII characters could be currency signs (e.g. $ or £). Note that the way the special characters classifier is integrated into the pipeline remains the same.

Integration Of The Tickbox Classifier (step 324)

The special characters classifier is integrated as follow in the regular ASCII OCR. The input is a cropped image from the original image representing a RoI. The output is a set of characters with ASCII and special characters. The regular OCR is run on the image. If the detection confidence for a word is under a threshold (typically 85%), this low-confidence word may be a special character, and the specific classifier is called. If a special character was detected, the regular OCR is called again with a new image cropped before the special character and after the special character. The output is then the concatenation of the string detected before the special character, the special character and the string detected after. If the input image contains several special characters, this process is applied several times. The pseudo-code is presented below.

Algorithm 1

| Tickbox classifier integration in OCR | |
|---|---|
| Data: Image with text | |
| Result: String (ASCII + tickboxes) | |
| string output = RunOCR(image) | >Run OCR |
| if (min conf < a) then | |
|     vec cc = ExtractConnectedComponents( ) | >Extract the connected components |
|     for each comp in cc do | |
|         RunClassifer(comp) | >Run tickbox classifier |
|     end | |
|     if tickbox detected then | |
|     str1 = RunOCR(image before) | >Extract text before |
|     str2 = RunOCR(image after) | >Extract text after |
|     output = str1 + tickbox + str2 | >Concatenate the output |
|     end | |
| end | |

0123456789 abcdefghijklmnopqrstuvwxyz

ABCDEFGHIJKLMNOPQRSTUV WXY Z

-+[]( ).!@#$%&-+='<>?/

However, special characters (i.e. Unicode characters) detection are not handled by the OCR software. They must therefore be detected separately with a specific classifier trained to detect specific special characters. In the case of form understanding, the expectation is to encounter tickbox characters. They can have four representations according to An advantage of this approach is if the confidence detection is high for all the words, there is no need to run the special character classifier. In this way, a gain of computational time has been measured, and while limiting the risk of false positives detection.

Tickbox Dataset Generation (Step 324)

Each font that may be encountered in a form has its own representation for tickboxes (as any other character). This creates a large variability in the shapes. In scanned forms, there is also the problem of noisy tickboxes where the edges are not as sharp as in the case of programmatic ones. Finally, the biggest challenge comes in the case of ticked tickboxes where the check mark is not centered with the box. This may happen when a blank pdf was annotated manually with a check mark, and the user did not center it correctly. Some examples of real tickboxes encountered in forms that illustrate these challenges are shown in FIG. 23, which are pictures of checkmarks from scanned forms.

Considering that the average number of characters in a filled form is around 3000, in the worst case this classifier will also be called 3000 times. This limit the classifier design in term of complexity and computational time. In fact, the overall process for all the characters should not take more than a few seconds. The features used must, therefore, be computationally inexpensive to extract and the model should not be too heavy. A naive solution would be to use template matching by computing the distance between the normalized candidate component and a mean empty tickbox/ticked tickbox. This easy to implement and computationally cheap solution works fine for clean tickboxes but is not able to capture all the granularity observed among tickboxes. In one example, there is a move towards a more complex feature-based model with a comprehensive training set.

Having a data set including all the variability observed in real scanned forms is essential to ensure a robust solution. The training was generated by extracting real characters from scanned forms.

Going through a manual identification process in real scanned forms, 200 empty tickboxes were extracted. Data augmentation was performed to artificially increase the training set. Each tickbox was rotated with an angle of [90, 180, −90] degrees increasing the total amount of elements to 800. On each element, a dilation and erosion were then applied to change the thickness of the tickbox. A visual assessment was finally made on each element to ensure that its final shape looks like a realistic tickbox. In total, the number of empty tickbox was increased to 1923. A similar approach was adopted for ticked tickboxes. The number of ticked tickboxes encountered being smaller than the empty ones and morphological operations being often impossible to perform on the ticked tickboxes without destructing its structure, all the images were also flipped vertically, horizontally, and both. The number of ticked tickboxes generated was approximately 2000. Finally, regular characters were directly extracted from a set of approximately 10 different forms to gather characters with various fonts and font sizes.

In the real data, classifying tickboxes from regular characters is a strongly imbalanced class problem. Furthermore, the distribution of the classes is not known a priory. In some forms, the inventors observe more 40 tickboxes in a page (over 1000 characters) and in some other, the inventors will not observe a single tickbox character. The expected percentage of elements of each class is therefore unknown. To address this problem, the number of tickboxes in the train data set was artificially increased to obtain a balanced data set. Two datasets were created, the first to address the empty tickbox vs characters classifier (i.e. 50% of tickboxes and 50% of characters totaling approximately 4000 elements). The second to classify empty tickbox from ticked tickbox from characters (33% of element in each class). Another approach to balance the data set could have been to weight more the misclassification of the tickboxes to rebalance the classes.

As explained above, there is a need for computationally inexpensive features and relatively light models. The features used to train the tickbox classifier are presented below and their choices are justified.

Figure 24:
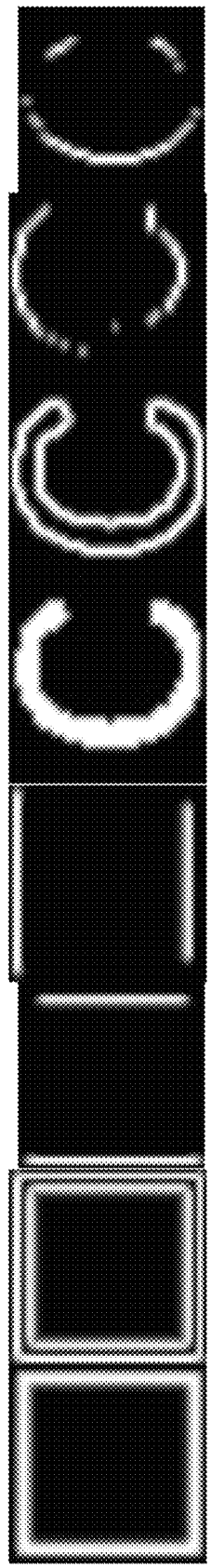
FIG. 24 are pictures of original, gradient magnitude, x-gradient and y-gradient for any empty tickbox and regular character C.

Oriented FAST and rotated BRIEF (ORB) Features: A first strong descriptor must be computed using the gradient of the image. Indeed, tickboxes are characterized by really sharp edges highlighted by their gradient. This intuition is illustrated in FIG. 24 illustrated is an empty tickbox and for a regular character the magnitude of the gradient, so as the x-gradient and y-gradient. From these images, observed is a strong x-gradient on the sides and a strong y-gradient at the top/bottom will characterize a tickbox character. Many descriptors based on the gradient of the image were developed like the HOG or the SIFT features taught by Lowe, David G. Object recognition from local scale-invariant features, Proceedings of the International Conference on Computer Vision. 2. pp. 11501157, 2007 and Robert K. McConnell. Method of and apparatus for pattern recognition, U.S. Pat. No. 4,567,610. In one example the claimed invention works with ORB features. It is a fast robust local feature detector, first presented by Rublee, Ethan; Rabaud, Vincent; Konolige, Kurt; Bradski, Gary. ORB: an efficient alternative to SIFT or SURF, IEEE International Conference on Computer Vision, 2011. ORB is based on the Features from Accelerated Segment Test (FAST) key point detector Rosten and T. Drummond. Machine learning for high-speed corner detection, European Conference on Computer Vision, volume 1, 2006 and the Binary Robust Independent Elementary Features (BRIEF) descriptor taught by M. Calonder, V. Lepetit, C. Strecha, and P. Fua. Brief: Binary robust independent elementary features, European Conference on Computer Vision, 2010. The teaching of each reference above is incorporated by reference in its entirety.

ORB was developed in the first place as a fast and efficient alternative to Scale Invariant Feature Transform (SIFT) features. ORB and SIFT are based on the same principle. First, detect key points in the image (relevant points like corner or edges) and then build a descriptor out of the detected key points. ORB features claim an overall accuracy on object detection similar to SIFT while decreasing the computational time by two. Due to their relatively cheap cost and high robustness, in particular to a rotation, ORB features appear to be an interesting descriptor for our problem.

The ORB descriptor must be computed on a normalized image (explained later in the development), to output 32 scalars normalized between zero and one to describe the image.

FIG. 24 are pictures of original, gradient magnitude, x-gradient and y-gradient for any empty tickbox and regular character C.

Euler Number: Considering a binary image, the Euler number is defined as in Eq. (4).

$$E = N - H \qquad (4)$$

where N is the number of regions in the image (number of connected components of the object) and H is the number of holes (isolated regions of the images background). The Euler number for an empty tickbox is zero (one region and one hole). In the alphabet, only really few characters have this characteristic (the letter P, O, Q, A, D and the numbers 0, 4, 6, 9). The Euler number is, therefore, a really strong descriptor for empty tickboxes. In the case of ticked tickboxes, this descriptor is not as relevant due to the number of holes that vary according to the check mark. The Euler number is normalized to obtain a feature between zero and one (see Eq. (5)).

$$e = \frac{1}{1+E} \qquad (5)$$

Before being able to extract features from the components, one has to normalize the input image. In fact, the cropped image representing a character does not have a specific size a priory. However, it is primordial to extract the ORB features on consistent images with the same size. The normalization process is as follow. The image is first resized to 64×64 using a bicubic interpolation over a 4×4 pixel neighborhood. The image is then recentered and rotated using an affine transformation (derived from the moment of the image). This process ensures a consistent input for features extraction.

The input feature vector describing each component is, therefore, a vector with 33 scalars normalized between zero and one (32 ORB descriptor and the Euler number). The classifier used is a Support Vector Machine (SVM) classifier. It has been shown that SVM exhibits some major improvements when used with normalized vectors.

Performance And Accuracy Of The Unicode Classifier

In this section the concept of precision, recall, F-score and confusion matrix is a starting point as they will be used to assess the performance of the 2 classifiers implemented. Precision: The precision p (also called positive predictive value) is the fraction of retrieved instances that are relevant.

Recall: The recall r (also known as sensitivity) is the fraction of relevant instances that are retrieved. F-Score can combine in the same expression the precision and the recall to create the F-score as shown in Eq. (6). The F1 score can be interpreted as a weighted average of the precision and recall, where an F1 score reaches its best value at 1 and worst at 0.

$$F = 2 \cdot \frac{p \cdot r}{p+r} \qquad (6)$$

Confusion matrix The confusion matrix is a visualization tool of the performance of a N-class classifier. Each column of the matrix represents the instances predicted in a class and each row represents the instances in the actual classes (ground truth).

For the 2-class classifier, tested on 2000 balanced samples (i.e. 1000 empty tickboxes and 1000 characters), the inventors measured the performances presented in Table 1. The overall performance in this case is satisfying. There is only one misclassification error on the overall dataset (a character identified as a tickbox). For the 3-class classifier, tested on 3000 balanced samples, the inventors measures the confusion matrix presented in Table 2. ET represents the Empty Tickbox class, TT the Ticked Tickbox class and CH the CHaracters. In this case, the inventors observe that the algorithm has more difficulties separating the ticked tickbox class from the character class.

TABLE 1

Performance of the 2-class tickbox classifier.

| | Accuracy (%) |
|---|---|
| Precision | 1.0 |
| Recall | 99.95 |
| F-score | 99.97 |

This was expected as the variability observed in the ticked tickboxes is higher than the empty tickbox. The accuracy numbers are good enough to integrate this classifier as presented previously in the overall OCR. Considering that on average the classifier is called 2000 times per page, the expectation is at most one or two errors.

TABLE 2

Normalized confusion matrix for the 3-class tickbox classifier (expressed in %).

| | ET pred | TT pred | CH pred |
|---|---|---|---|
| ET true | 99.97 | 0.0 | 0.03 |
| TT true | 0.0 | 99.79 | 0.21 |
| CH true | 0.00 | 0.27 | 99.73 |

Remark: Considering the large variability observed among the tickbox characters and the defined problem (i.e., work with normalized images), a deep learning approach was also envisaged and implemented, showing promising performances. However, due to difficulties encountered in the integration into the whole framework, in this example the feature-based solution is adopted which was described above.

From A Blank Form To Entity Extraction (Steps 330 and 332)

This section explains how from an unknown blank form (i.e., with all the fields empty), all the fields are extracted and understand the hierarchy. As presented in the introduction, the output of this module should represent the form in an abstracted way. The level of abstraction should be high enough to represent any form.

In one example the content is formatted in forms according to a pre-defined architecture. This representation must preserve the structure/sectioning of the form while being adaptive enough to represent any forms. Having a common architecture among all the forms allows for easier post-processing. One can then analyze the content of various forms and highlight patterns. The extracted text can also be more easily fed into a Natural Language Processing (NLP) application afterward.

From the analysis of blank Adverse Event forms, the inventors discovered that almost all of them follow a hierarchy. By hierarchy, a group of questions semantically linked is denoted, gathered under a joint section illustrating this semantics. In some highly structured forms, a section can have a child that is also a section (i.e., a subsection), that is linked to a set of child questions. This hierarchy is illustrated with two examples from the CIOMS form (see FIG. 1) and the FDA-3500 form (see FIG. 2). There are sections, the subsections (if any) and the questions.

In this example each option in a tickbox question is represented as a question and the introductory text of the options as a subsection. Therefore, taking FIG. 22 as example. "CHECK ALL APPROPRIATE TO ADVERSE EVENT" is classified as subsection and the underlying options "PATIENT DIED", "INVOLVED OR PROLONGED INPATIENT HOSPITALIZATION", "INVOLVED PERSISTENCE OR SIGNIFICANT DISABILITY OR INCAPACITY" and "LIFE THREATENING" as questions. In this way, each option can be seen as a binary question, being set to "True" if the tickbox is ticked and "False" otherwise.

In this example, an extra side information category is constructed for all the general guidelines on how to fill the form (e.g. "Write in capital letters" or "For more information, call 1-866-456-4489").

Two solutions were investigated, adopt a flat representation of the form or have a hierarchical one. In a flat representation, all the entities (questions, sections, subsections) are represented one after the other. In this case, the hierarchy is provided through an attribute linking for each question its section. In a hierarchical representation, the structure of the form is imitated in the JSON file where each section contains a set of questions and subsections that also contain a set of questions, etc.

In this example the hierarchical representation is used for its straightforward readability and convenience to access to the fields. Also, this architecture has the advantage to represent complex forms with more than one layer (going down to a subsection, subsubsection, etc.) without having a complicated way of linking the bottom question with the first layer.

Figure 25:
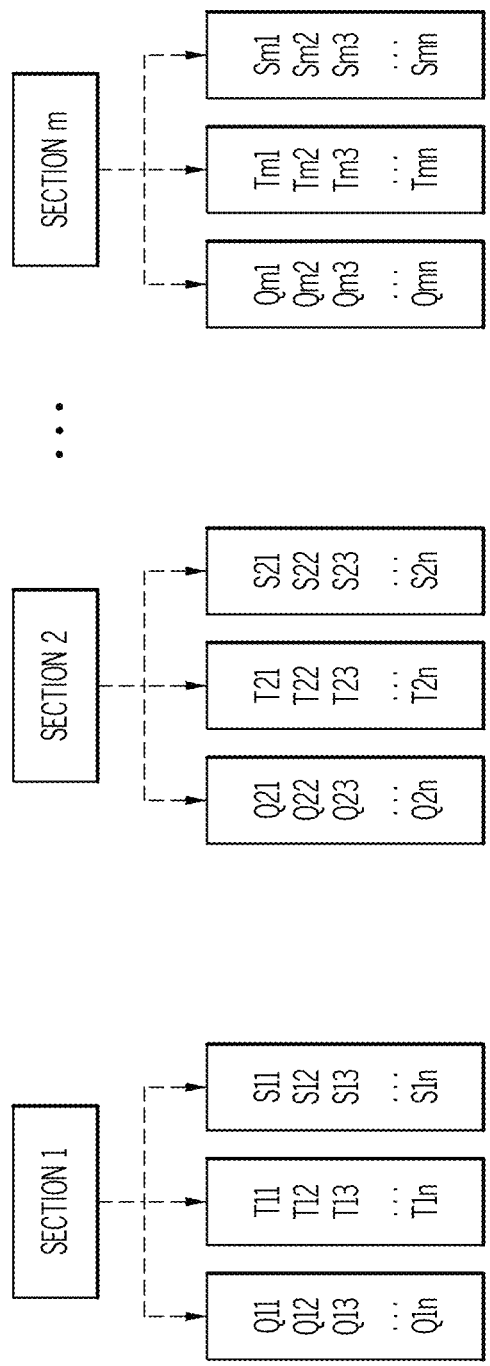
FIG. 25 are illustration of a form hierarchy in which Q refers to questions and S to section and T to a simple text.

The hierarchy can be schematized as shown in FIG. 25 in which Q refers to questions and S to section and T to a simple text. Each section contains a vector of questions, a vector of other text (side information) and a vector of sections. This vector of sections also contains a vector of questions, texts, and section, etc. For each question, if the question is binary (tickbox question) is specified. Finally each entity in the form is given a unique identifier called the entity type. This identifier is used to characterize in the entity wo which the fillable form belongs. An example representing the blank JSON file for CIOMS forms is given in the appendix.

The SEE module described above is directly applied to the blank form, outputting a set of texts containing the bounding box of the RoIs, the string extracted and the confidence in the detection. For each text, a set of features is computed describing the string with its typography and dimensions. The features are then used to classify the sections and the questions in an unsupervised way as further described below. Once classified, an entity type is set to each element. The entity type aims at characterizing the questions (or section) in an abstracted way to make the output form query-able. Details are presented in further below. The extracted elements and their type are then dumped in a JSON file following the representation presented previously. Manual corrections if required are then made on the JSON file to ensure an error-free representation of the blank form that will be used to analyze the filled forms.

Form Family Description

In this section more details about the extensible, location agnostic method in presently claimed invention are described. The pipeline consists of an offline form family description phase and an online form understanding phase, which is divided into object extraction, form family identification, known text extraction and question answering.

Since all information introduced by the data provider is unknown to the data collecting entity, the form family can only be described in terms of the static content of the form: headers, questions, instructions, etc. In order to achieve a location agnostic method, all spatial information in the static content of the forms is discarded, and described a form family from the logical point of view. In that respect, each form family is mapped to a tree of text items classified into the following categories:

Section a tree of sections is required to define the hierarchy of the form family. Every section is defined by a text (which may correspond to one among a list of variations). Sections always contain at least one text of other types (sections, questions or other), i.e., they cannot be leaf nodes in the tree.

A question type of text is always a leaf node in the hierarchy of the form family. Every question is defined by a text (which may correspond to one among a list of variations), and two binary attributes: whether the question is a checkbox or whether the question is part of a tabular structure. Questions are assigned a data element code for comparison with the ground truth and normalization across form families.

Other any other text which does not conform the structure of the form. Every item is defined by a text (which may correspond to one among a list of variations).

Form Type Classifier (Step 328)

The form type classifier is implemented to detect if the page under analysis is a form. If the input is a form, the classifier should tell the form type and load the appropriate blank JSON file. Considering that the whole pipeline will analyze a large number of documents, probably not sorted with potentially various input forms, having the capacity to recognize the form is mandatory.

At the input of the classifier, the output of the SEE module (text and frame information) is accessed. This information is used to build a classifier that is both content-based and structure-based. The content-based part is looking if the page contains a set of keywords characterizing the form. This constraint is relaxed to allow for noisy input, and the distance (normalized Levenshtein distance) between a set of words and the content of the form is computed. If this distance is higher than a threshold, the content-based is validated.

For instance, CIOMS forms are characterized by their title "CIOMS FORM". The algorithm is, therefore, looking into the set of text regions identified if this string was detected, or if the minimum Levenshtein distance between this string and all the text regions is smaller than a threshold. Having a classifier only based on the content can generate errors especially if for instance, the first page of a document is an email describing the content of the form. In this case, it is likely to find the same identifiers. These mistakes are avoided by looking at the structure of the page extracted. If a clear structure was identified with both horizontal and vertical lines creating boxes exists, then the current page must be a form. The horizontal and vertical lines in a binary image are gathered. By counting the number of isolated elements (number of connected components), a good approximation of the number of fields in the form is determined. For each known form, the number of boxes it contains is counted. If a similar number of boxes in the page under analysis is counted, the structure-based is also validated and the corresponding blank JSON file is loaded. This approach has the advantage to be computationally inexpensive, because the system is extracting the connected components on the RoI image, with approximately 50 components. Considering that the number of forms to analyze in the current implementation is limited, this algorithm is robust enough to classify the forms. Another approach using the structure of the form was also envisaged using the SIFT descriptors. By determining the number of key points in common between a template structure characterizing the form and the current filled form, the similarity between the two documents is indicated. However, the inventors observed on the real data that, for a form of type A, there exist slightly different structures making them unrecognizable with the SIFT features.

Remark: If the input was a form but was not recognized as a known form (i.e. an empty form template to match it is not available), the algorithm will similarly to plain text, dump the output of the SEE module directly in a JSON file.

In this phase a JSON file is created that contains an abstraction of the structure of the form family ad-dressing all the variability identified. FIG. 28 shows an example of the structure of the JSON template.

A Blank Form To Entity Extraction (Step 328)

This section explains how from an unknown blank form (i.e., with all the fields empty), all the fields are extracted and understand the hierarchy. As presented in the introduction, the output of this module should represent the form in an abstracted way. The level of abstraction should be high enough to represent any form. The empty form to field extraction pipeline and each module are then described in details.

Section vs. Question Classifier (Step 344)

The Section vs. Question classifier aims at extracting the first layer of the hierarchy in the form. The sub-section assumes that if a text region is not a section, it has to be a question. This assumption holds for most of the cases. The number of supplemental texts representing side information being rather small compared to the number of questions. This classifier is also not able to extract the subsections. Except if the hierarchy of the form is simple, manual corrections will have to be done on the output JSON.

The approach adopted is to extract a set of features from each text region. All the sections are assumed within a form should share this set. Indeed, headers usually follow the same format (similar font, font size etc.). In another example, when there is access to a large set of of blank forms, applying classics supervised machine learning techniques on the extracted features is feasible. The method kept was to cluster the features and try to identify the cloud of points corresponding to the Sections. All the other points will be therefore interpreted as questions.

The following features were extracted on each text region:
the number of words in the string
the number of uppercase words in the string
the number of words containing lower and upper case characters
the number of alpha-numeric words
the number of characters being letters
the number of characters being numeric
the number of characters being non alpha-numeric
the length of the bounding box normalized by the average bounding box length
the height of the bounding box normalized by the average bounding box height From the set of nine features described above, six binary features are constructed, as depicted in the list below. The binary features were chosen such that all the texts representing the sections should have the same values.
1. set 1 if the string contains more than 1 word made of lower and uppercase characters
2. set 1 if the string contains more than 1 number
3. set 1 if the string contains more than 2 words
4. set 1 if the string contains an uppercase word
5. set 1 if the height of the bounding box is larger than the average height
6. set 1 if the length of the bounding box containing the string is longer than the average length A hash number characterizing each text is then computed from the binary features as shown in Eq. (7).

$$h = \sum_{n=0}^{6} f_n \cdot 2^n \quad (7)$$

where h is a hash number characterizing the text and $f_n$ is the $n^{th}$ feature as presented in the list above (with the same order). The number of possible hash numbers is given by $2^6=64$. Some features being the same for all the texts in a form (for instance forms where all the text is written in uppercase), the number of hash numbers observed in a form is often under this maximum, approximately 30 from our experiments. The set of texts is then grouped with their hash number. The challenge is to identify the hash (or cluster) that corresponds to the sections (assumed that all the sections share the same features and by consequence the same hash number). For each section identified, all the text regions below are considered to be children of this section till another section is encountered. If the form has two columns (with sections in each column), all the questions at the right of the sections are assigned as their children. This assumption is verified in most of the forms for single-column (e.g., CIOMS), double-column architecture (e.g., FDA-3500) or mix (e.g., Celgene AE). Indeed, it is doubtful to observe questions that relate to a header at its top.

By looking at the distribution of headers and questions among a set of forms, there are two elements observed. First, the number of headers compare to the number of questions is small. Secondly, the number of questions that should be assigned to a section is relatively constant within a form. In other words, a hash number (characterizing a set of texts) is searched that will at the same time minimize the number of sections and maximize the average number of questions assigned per section. The set of sections as S and the set of questions per section as Qi where i E [0, |S|−1] is denoted. Then the problem can be formalize as:

$$\min_h \frac{|S|}{\frac{1}{|S|}\sum_{i=0}^{|S|-1} |Q_i|} \quad (8)$$

However, with this formulation, the sub-section will tend to choose an isolated cluster in the form as the section hash and assign all the other texts as its children. To correct this undesired behavior, the median number of questions per section is maximized instead of the average. The problem is also constrained to have at least 3 three sections. By looking at blank forms, this assumption holds in almost all the cases where in which the inventors observe a hierarchy. The problem can then reformulated as $$\min_h \frac{|S|}{\text{median}\{|Q_i|\}} \text{ with } |S| \geq 3 \quad (9)$$

Eq. (9) can be easily implemented by looking at all the hash numbers with more than two texts and computing the ratio between the number of sections and the median number of questions assigned per section. Considering that there may be a hash number that due to randomness optimizes Eq. (9) but that is not the section cluster, a threshold on the minimum acceptable hash number is set. Indeed, the features with a large weight assigned in Eq. (7) are highly likely to represent the sections. Expected is that the header fits in a bounding box longer and with a larger height than the average due to larger font size and boldness typography. In the same way, it is also more likely for headers to be written with uppercase characters.

Vertical Merging (Step 340)

As explained previously, the SEE outputs a set of text lines in FIG. 3. However, many questions in the form are written on two or three different lines. To find the best match between the original known question from the blank form and the one in the filled form, the questions are merged.

The merging of two text regions is based on two elements, the relative position of the bounding boxes and the absence of lines between the bounding boxes. From our observations on several forms, a question is never cut by a line in the middle except if the text is underlined. This case being rare, it this example is considered a corner case or outlier and will not be addressed.

The two text regions must fulfill the following conditions to be a valid match.
the vertical distance between the two bounding boxes must be smaller than the maximal height of the bounding boxes.
the difference between the left-x coordinates of the bounding boxes must be smaller than the maximal width of the bounding boxes.
their must not be a horizontal line between the bounding boxes (condition always verified for questions written on several lines).

This process outputs a new set of merged texts, with updated bounding boxes and confidence.

Entity Type Matching (Step 344)

As briefly presented previously, the entity type (or attribute) is a representation of a question or a group of questions gathered under the same section. For instance, in the case of Adverse Event, when the form asks for the seriousness of an event, it may be written to set the "Event Seriousness", the "Seriousness Criteria" or to "Check all appropriate to adverse reaction". In the three cases, semantics are preserved and only the way of asking the questions differs. All the possible variations in the typography of the text (uppercase, lowercase, numbering, etc.) is expected. The entity type for this question will, therefore, be a unique identifier characterizing the semantics behind this set of similar questions. This identifier will be the same across all the blank forms analyzed.

In all the AE forms, a section about the patient information grouped under the entity type "Patient Information" will be found, another about the drug characteristics a patient is taking grouped under the entity type "Drug Characteristics" and so on for all the sections and questions.

In this way, forms that belong to the same domain (Adverse Event forms in this case) have a universal representation. This is making the output of the form query-able. For example imagine the processing a set of ten different AE forms. To perform for instance statistics on the date of birth of all the patients, the attribute "Date of Birth" (a really generic question asked in all the forms) is located in the output JSON file to have access to this information. Without the attribute information, would require manually inspection of each blank form and determine how the question was asked exactly making the process long and not scalable.

Note that if a question does not match any entity type, the attribute is set as "unknown".

The process of matching each question/section to an entity type is for the moment a manual process. Due to time limitations, this sub-section was not implemented.

Remark: In this section, in one example manual corrections or human inspection may be used. This process is unavoidable even if advanced sub-sections are implemented at each stage. In fact, the output of each blank form being the input to analyze a really large amount of filled forms, any error whether at the OCR, hierarchy or entity type stage cannot be accepted.

From Filled Form to Knowledge

At this stage of the process, the capacity to extract the textual content and the frame of any form is accessible. Also the understanding of part of the hierarchy in most of the blank forms is known. Next described is how the understanding is made and the knowledge built from the two modules introduced previously. The input of this process is a known filled form and a JSON file representing its hierarchy (i.e., all the questions, sections and how they relate following the representation introduced in above). The whole pipeline is first introduced before presenting how the information from the blank is used to extract the answers in the filled ones. This process is called the Question and Answer (Q&A) matching. The main concept behind this sub-section is to look for each identified question from the blank form its position in the filled form. This comparison should be done only using the content of the text itself. Once the question is identified, an sub-section will assign the most likely text as an answer to this question.

Known Text Identification (Step 344)

The known text identification sub-section corresponds to repeat for all the strings from the blank form, a text matching sub-section.

The text matching sub-section aims at finding the text region in the filled form that is the closest to the known string extracted from the blank form. The identification is done by comparing strings. As explained in the introduction, the absolute location in the blank form of the question is not taken into consideration to find the answer in the filled form. With this approach, the sub-section is agnostic to any change of font, font size, italics, font underline, change in indentation or question ordering between the blank form and the filled forms. The comparison between the set of characters extracted from the filled form and the ground truth sequence read from the empty JSON file is based on the Levenshtein distance. The Levenshtein distance determines the minimum number of insertions, deletions, substitutions that must be applied to the first sequence to be equal to the second one. Two identical sequences have therefore a Levenshtein distance of zero. More details on the Levenshtein distance algorithm and in particular on the normalized distance are presented.

The algorithm is following the hierarchy extracted in the blank form. First, the section title is analyzed, then the questions from Sec 1, then the questions from the subsection 1 of section 1, the questions from subsection 2 of Sec 1 etc. In this way, every time a question is analyzed and potentially a suitable answer is found, the vector of texts can be updated (i.e., by removing the text regions already matched) reducing the complexity of the text matching algorithm.

While developing the text matching algorithm, two concepts are kept in mind. First, the text corresponding to the question may contain OCR errors. Second, the question from the blank and from the filled form may not be the exactly the same. It is expected to encounter typography changes (questions written in uppercase in one form and in lowercase in the other) and formulation errors (i.e. "3. HEIGHT" becoming "HEIGHT"). The presently claimed invention or algorithm must give space for mistakes. With this background the present invention is looking for the best match instead of the perfect match.

The input of this pipeline is as explained previously a set of text regions, where each text represents a region semantically consistent. A text will represent either a section, a supplemental text, a question, the concatenation of a question and an answer or finally an answer. In the case of binary questions, it is also likely to have grouped in the same text region, the general question and all the options. An assumption is that in a text, several questions will not be observed. If the assumptions made previously to generate the RoIs in the SEE module are correct, this should always be the case.

The matching is performed as follow. Consider the purpose is to find the question Qref in the set of text regions extracted from a filled form. The first step is to pre-process the strings as follow:

transform the strings in lowercase
 uncheck all the tickboxes
 remove all the spaces
 remove all the back to line characters With this preprocessing, the matching is made agnostic to changes in typography (uppercase, lowercase). Common mistakes made by some OCR software which are adding extra spaces in sentences or within words and adding back to line characters between lines in a paragraph is also handled. Note that the tickboxes are unchecked as the binary questions from the filled form may be checked.

Then for each preprocessed text, a set of candidate strings is built with the same size as the preprocessed question Qref. If the length of the string in a text region is smaller than the length of Qref, only one candidate string equal to its raw content is built. This idea is illustrated with an example as follow.

1. Qref: FIRST NAME
2. Qref,norm: firstname
3. Raw matching text Ti: FIRST NAME \n GJ
4. Ti,norm: firstnamegj
5. Vector of candidates: [firstname, irstnameg, rstnamegj]

At this point, a set of text regions is identified and for each text region, a set of candidates is created that have to be compared with the reference question. The Levenshtein distance is afterwards directly applied to all the candidates. The candidate with the lowest distance wrt. the reference question is the matching text. When a match is found, its location (bounding box) is set in a form data object (i.e. an object following the expected hierarchy of the blank form).

Remark 1: If the normalized Levenshtein distance (normalization between 0 and 1) is too low, typically if the best match has less than 50% of the characters in common with the reference, in this example the question is deemed not in the filled form and it is discarded.

Remark 2: If a perfect match is found with more than one text region, which is likely to occur for common questions like "DAY" or " YES", the text that is the closest to its relative section or subsection is picked. Therefore, the algorithm tries to match the reference section with one of the text. If a suitable match is found, the assumption is that the section is located above the question and the Euclidean distance is computed between the centroids of the bounding boxes to match it with the correct text. If the relevant section is not found in the set of text regions, the text with the shortest length is selected.

The output of this process is then a form data object containing all the sections, supplemental texts, and questions identified with their location in the filled form. All the remaining elements in the set of texts extracted from the SEE are sent to the output. In the ideal case, this vector should at this point contains only the answers.

Question and Answer Matching (Step 346)

The Q&A sub-section adopts a string content-based approach combined with a machine learning model to address the matching problem. The sub-section will first try to identify all the known text from the blank form in the filled form. All the texts from the filled form that were not identified are considered as answers. A regressor is then applied on each of the remaining text to determine to which question it belongs to.

The core Q&A matching sub-section pipeline is presented in FIG. 3. The claimed invention is introduced to extract all the known text from the filled form. Then, discussed is how to set an answer to the regular and binary questions.

Regular Question Analysis (Step 346)

Figure 26:
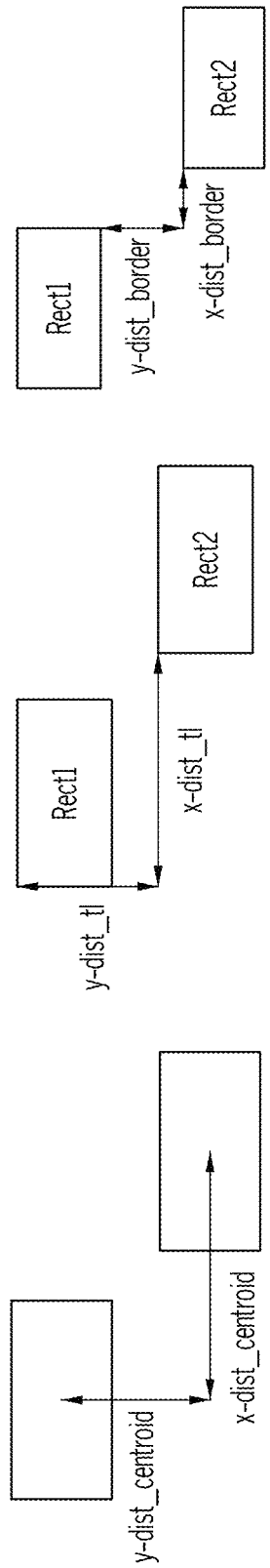
FIG. 26 are features used for the questions and answering algorithm based on the relative positions of the bounding boxes of the text elements being analyzed.

Turning now to FIG. 26 are features used for the questions and answering algorithm based on the relative positions of the bounding boxes of the text elements being analyzed. At this stage, all the known text (questions, sections, subsections, other texts) of the filled form is removed from the set of text regions (extracted from the SEE). Recall, that the bounding boxes of each identified question and remaining texts is available. The remaining elements are therefore assumed to be answers and must know be matched to the correct question.

The challenge is to find for each text, the question that is the most likely to be linked with. This can be formalized as a 2-class problem, where a 0 corresponds to two elements that should not be matched and a 1 to two elements that should be matched. Consider that N questions were identified and M texts have to be matched. All the question/answer couples as (T3, Qi), where Qi represents the ith identified question, with i E [0, N−1] and T3, the $j^{th}$ text to match, with j E [0, M−1] is denoted. For each couple (T3, Qi), a probability of Qi being linked with T3 is computed. For each text there are N probabilities. The textT3 is assigned as answer to the question with the highest probability of being linked.

The following procedure is applied. First extract a set of features for each couple (T3, Qi). This set is then regressed using an SVM model (explained in details as follow) to output a probability between 0 and 1. The assigned answer is simply the one with the highest probability. Note that all the answers are completely independent from each other in the sense that several answers can be set to the same question. The order of matching is in this way not influencing the output.

For each couple (T3, Qi), extract the following features:

the x-distance between the 2 centroids of the bounding boxes (FIG. 26 middle).
 the y-distance between the 2 centroids of the bounding boxes (FIG. 26 middle).
 the x-distance between the 2 top-left corners of the bounding boxes (FIG. 26 left).
 the y-distance between the 2 top-left corners of the bounding boxes (FIG. 26 left).
 the closest x-distance between the two rectangles (FIG. 26 right). This distance will be zero if the two rectangle are overlapping according to the x-axis.
 the closest y-distance between the two rectangles (FIG. 26 right).
 a binary features set to one if the text bounding box is completely on the left of the question bonding box. Mathematically speaking, the condition is respected if the extreme right point of the text box is smaller than the extreme left point of the question box.
 a binary features set to one if the text bounding box is completely at the top of the question bonding box. Similarly, the condition is respected if the extreme bottom point of the text box is smaller than the extreme top point of the question box.

All the distances are then normalized by the size of the input image (i.e., the x-distances by the width and they-distances by the height of the image). In this way, a set of 8 features normalized between 0 and 1 is constructed.

In FIG. 26, the choice of the L1-distance is motivated as main features for the answer matching problem. Each of the six distances computed between a text box and a question box is shown, the distribution of the distance (represented in the diagonal) is shown. All the other terms highlight the pairwise correlation between 2 features. Note that the features presented in the graph follows the description made previously. For example, in the top-left corner, the distribution of the x-distance between the centroids of the bounding boxes is observed.

The inventors note that all the features are located around the same distance, demonstrating their capacity to discriminate the positive samples from the negative ones. The second observation is that the y-distance occupies a narrower space in the distribution than the x-distance and are expected to be better features. This can be explained from the fact that an answer generally follows directly a question. Therefore, the y-distance will be always similar whereas for the x-axis, can have different spacing and sizes for the bounding boxes creating more variability.

The model was trained using the Health Canada form, highlighting all the challenges faced in the matching problem with densely packed questions, a double-column architecture, short and long questions and answers including full paragraphs. For each of the remaining text to match after the known text removal (approximately 60), the 8 introduced features are computed with the 28 identified questions. In total, 60×28=1680 training samples were constructed. The text is manually annotated that had to be linked with the appropriate question. A Support Vector Machine regressor was trained using a Radial Basis Function (RBF) kernel. The C (defines the smoothing of the surfaces) and y (defines how far the influence of a single training example reaches) parameters were both set to 1. The regressor model was finally integrated into the system for testing. From tests made on several forms, the model appears to capture most of the combinations between questions and answers.

The limitation is this approach comes from undesired noise in the set of texts to match. In fact, despite the string corresponding to the answers, unmatched part of questions or single characters floating in the form were encountered, due to for instance a bad line removal process. The single characters noise corresponds mainly to "I" or [ characters. To address this problem, a threshold on the minimum acceptable probability of two elements being linked is set. This technique limits significantly the risk of assigning noise as an answer but will not address all the cases.

To flatten and normalize the output, a post-process is performed such that it respects the following rule:
  an answer cannot start with a space character
  an answer cannot start with a back to line character
  an answer cannot finish with a space character
  an answer cannot finish with a back to line character
  2 words cannot be separated by more than one space character An example of the matching solution is presented in appendix, in the form of a JSON file.

Binary Question Analysis (Step 346)

Matching a binary question is straightforward. In fact, if the text matching module was able to find the correct match and that this match includes a tickbox character, the system determines if the tickbox corresponds to a ticked tickbox (case "TRUE") or to an empty tickbox (case "FALSE").

Extension To Multi-Page Analysis

In the pipeline described above in FIG. 3, the input is an image representing a known scanned form is assumed. However, this assumption may not always be satisfied, and the sub-section should be adaptive enough to react when an unknown document, made of potentially several pages is set as input. In this section, described is extending the pipeline or flow to an unknown multi-page document.

Full Pipeline (300)

The input filled form is first sent to the SEE module outputting a set of text lines in the same way as in the section above. The text lines are then merged vertically to construct paragraphs as presented above. The new texts are finally analyzed with the questions extracted from the blank form using a matching sub-section. The Q&A matching is described in details in below. The output of the sub-section should respect the same architecture as the blank form JSON with the answers filled for all the questions. The bounding box of each answer, so as the confidence should also be stored.

The idea behind the multi-page analysis sub-section is to be able to detect if the document contains forms and if it is the case, call the Form Understanding process with the correct blank form. The proposed pipeline is presented in FIG. 3.

Consider an unknown input PDF document containing N pages. This pdf (programmatic or scanned) is converted into a set of jpg images. For each image, the following process is applied. The image is going through the SEE module to extract its structure and text in the same way as in a single-page analysis. From the texts extracted, a classifier is called to identify if the image is a form and if it is the case, to extract the form type described above. If the image was not identified as a form, the content is dumped to a JSON file following the format presented in Sec. 2.1.2. If the type of the form was identified, the algorithm will load the corresponding blank form to go through the Form Understanding module. As before, the output of the FU is dumped in a JSON file following the format presented in Sec. 2.2.

All the JSON files generated (one per page) are concatenated in one JSON file representing the content and knowledge extracted from the original document. For each page, its type (form or plain text) is stored. If the page is a form, the name of the blank form used for the matching is also stored.

Having this multi-page analysis capacity allows for much more flexibility in the input. For instance, more complex forms where some additional information were written in a plain text page after the actual form can be studied. The content will be extracted and stored. However, the algorithm is not able to link the additional information with the original question. Some manual linking must be performed in this case. Another example is considering that the forms studied are scanned, they are often sent via emails where the first page corresponds to the actual email and the second to the form.

Graphical User Interface

An example of the output JSON file 350 of FIG. 3 is shown in FIG. 28. This output JSON file 350 can be used to build an interactive graphical user interface. FIG. 29 is an example graphical user interface 2900 showing tabular answers that were matched using the overall flow of FIG. 3 for the fillable form document of FIG. 1. Shown is a tabular section of a fillable form document. The answers as in boxes 2914 through 2924 below the questions 2902 to 2912 to which they were automatically associated using the process flow in FIG. 3. In one example, this graphical user interface of FIG. 29 may be interactive in which the contents are updated based on a user selecting certain thresholds. At least two thresholds are possible. The first threshold is a confidence threshold value for the extracting the textual content using OCR. A second threshold is a confidence threshold for Q&A bounding box matching. This second threshold determines a textual answer to each textual question in the set of textual questions. By using these thresholds, the user can determine how well the system is performing based on these threshold values. The display including the answers in the tabular form may change depending on the user selections. This graphical user interface is important to help provide feedback to the user on how well a given entities form type may be recognized. Whether OCR values and functions need to be tuned and more.

Operating Environment

Figure 30:
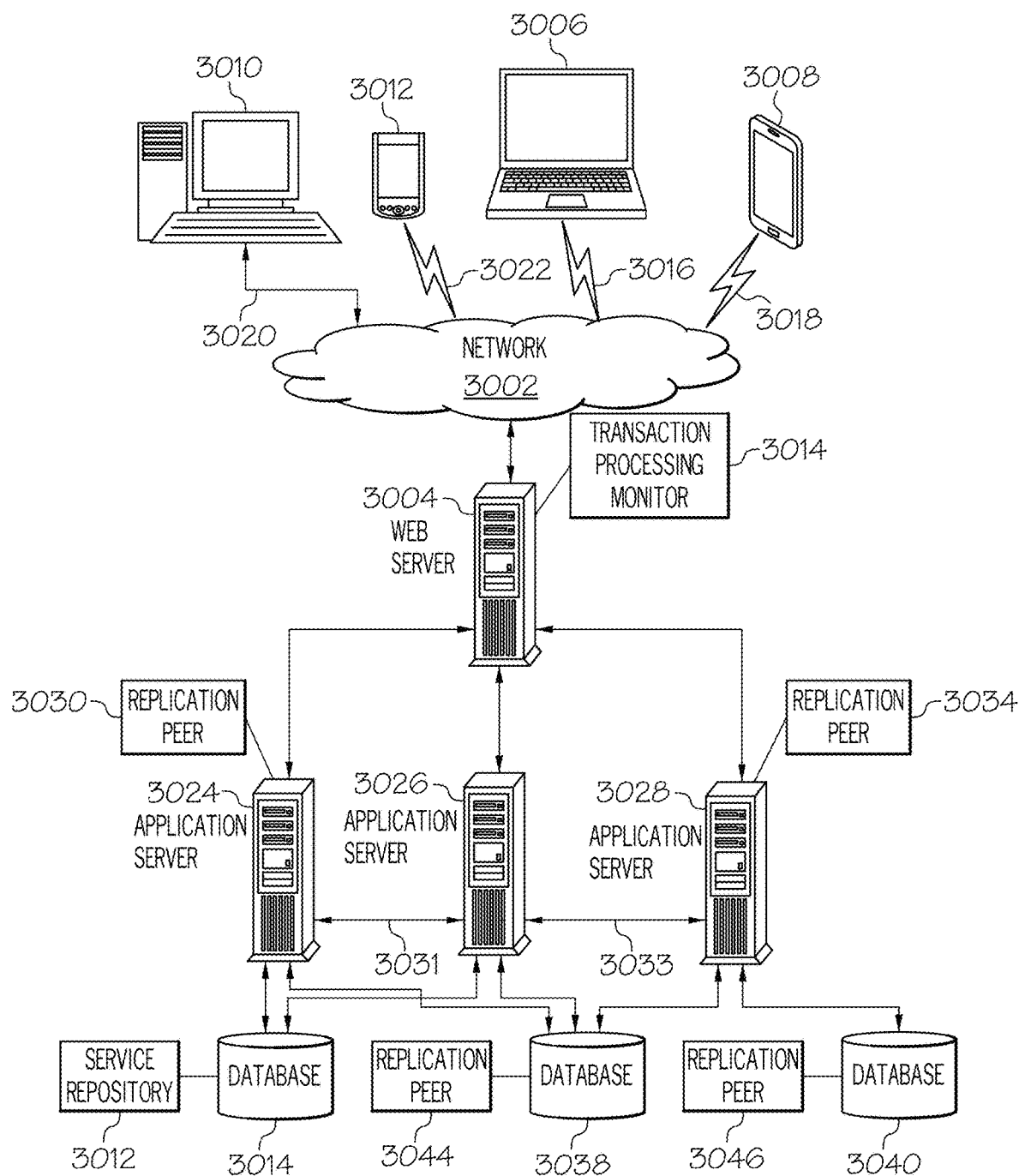
FIG. 30 is the n-tier architecture upon which flow diagrams of FIG. 3, FIG. 5 and FIG. 14 can operate.

FIG. 30 is the n-tier architecture upon which flow diagrams of FIG. 3, FIG. 5 and FIG. 14 can operate. It should be noted that although the following discussion is directed to a cloud computing environment various embodiment are not limited to such environment and are application to non-cloud computing environments as well.

It is important to note that although only a 3-tier architecture is shown, those of average skill in the computing arts will appreciate that this architecture can be easily extended to four or more tiers as in a multi-tier or n-tier system.

FIG. 30 is the n-tier architecture upon which flow diagrams of FIG. 4 through FIG. 6 and the dashboards can operate. It should be noted that although the following discussion is directed to a cloud computing environment various embodiment are not limited to such environment and are application to non-cloud computing environments as well.

It is important to note that although only a 3-tier architecture is shown, those of average skill in the computing arts will appreciate that this architecture can be easily extended to four or more tiers as in a multi-tier or n-tier system.

Referring to FIG. 30 shown is a multi-tier system architecture with a tier of clients 3010, 3012, 3006, 3008, a tier of application servers 3024, 3026, 3028, and a tier of non-volatile storage in databases 3038, 3040. This multi-tier client/server architecture improves performance and flexibility for systems with a large number of users. Flexibility in partitioning can be as simple as "dragging and dropping" application code modules onto different computers in some multi-tier architectures.

This multi-tiered system has evolved from a more conventional system architecture in which clients retrieve information from a database, process the data according to instructions from a user, and store the data in the database. The clients in the conventional system architecture have three types of computer instructions installed and running on them to process information: code for the user interface (displaying buttons and lists of data), code for interacting with the database to fetch or store data, and code that processes the fetched data according to commands from the user interface or business logic. In contrast, in the multi-tiered system architecture, the client may contain only user interface code. The code for interacting with the database and processing the data is installed and operating on a middle-tier of servers such as application servers of FIG. 30. The middle tier of servers interacts with the database and processes data on behalf of the client. The multi-tiered system of architecture therefore has these advantages: the forced separation of user interface and business logic, a low bandwidth requirement for the network, and the concentration of business logic code in a few machines —rather than inserting business logic into all application software on all of thousands or millions of clients.

There are a variety of ways of implementing this middle tier, such as transaction processing monitors, message servers, or application servers. The middle tier can perform queuing, application execution, and database staging. For example, if the middle tier provides queuing, the client can deliver its request to the middle layer and disengage because the middle tier will access the data and return the answer to the client. In addition, the middle tier adds scheduling and prioritization for work in progress.

The exemplary web server 3004 of FIG. 30 also has installed and operating on it a transaction processing monitor (TPM) 3014. The TP monitor technology is a type of message queuing, transaction scheduling, and prioritization service where the client connects to the TP monitor (middle tier) instead of the database server. The transaction is accepted by the monitor, which queues it and then takes responsibility for managing it to completion, thus freeing up the client. The TPM 3014 provides applications' services to many clients by multiplexing client transaction requests onto a controlled number of processing routines that support particular services.

The system of FIG. 30 includes several exemplary clients 3010, 3012, 3006, and 3008. A client is a computer or a process or thread running on a computer that requests resources or services from another computer. Exemplary clients of FIG. 30 include: a personal computer 3010 coupled to the network 3002 through a wireline connection 3020, a personal digital assistant (PDA) 3012 coupled to the network 3002 through a wireless connection 3022, a laptop computer 3006 coupled to the network 3002 through a wireless connection 3016, and a mobile telephone 3008 which is coupled to the network 3002 through a wireless connection 3018.

The system of FIG. 30 includes a data communications network 3002 which provides for data communications among clients 3010, 3012, 3006, 3008 and web server 3004. A network is a group of computers coupled for data communications according to data communications protocols through other computers typically referred to as routers, bridges, or switches. (The routers, bridges, and switches are not shown on FIG. 30.

The system of FIG. 30 includes web server 3004. A server is a computer or a process or thread running on a computer that receives, processes, and responds to requests for resources or services from another computer. A web server is a server that carries out data communication according to a hyperlinking protocol. A common example of a hyperlinking protocol is the HyperText Transfer Protocol, the foundation of the World Wide Web. The term 'web server' is used in this specification more broadly, however, to refer to any server that support any hyperlinking protocol, including, for example, the Wireless Access Protocol (WAP), the Handheld Device Transport Protocol (HDTP), and others as will occur to those of skill in the art. The web server 3004 provides static web pages in responses to clients as well as dynamic web pages in such formats as Java Server Pages (JSP), PHP Hypertext Processor (PHP) pages, Microsoft's Active Server Pages (ASP), and Common Gateway Interface (CGI) scripts, and others as will occur to those of skill in the art.

Some caution is advised in use of the terms 'client' and 'server' because whether a particular computer acts as a client or a server depends upon role. In the system of FIG. 30, for example, when web server 3014 receives from personal computer 3010 a request for a web page, web server 3004 is acting as a server; when, however, web server 3004 requests resources from application server 3024 in order to fulfill the request from personal computer 3010, web server 3004 acts as a client.

The system of FIG. 30 also includes application servers 3024, 3026, 3028 coupled for data communications to web server 3004. The application servers 3024, 3026, 3028 are also connected to databases 3038, 3040 and to each other 3031, 3033. The system of FIG. 30 also includes non-volatile storage in the form of databases 3038, 3040. The application servers 3024, 3026, 3028 and the databases 3038,3040 have installed and operating on them replication peers 3030, 3034, 3044, 3046. A peer is a computer or a process or thread running on a computer that has the same capabilities of requesting and responding to requests as other computers similarly situated in a network. A replication peer is a software module that stores on a replication medium sessions flushed from a replication queue. A replication peer 3044, 3046 may store a session from an application server 3024, 3026, 3028 to non-volatile storage in a database 3038, 3040. A replication peer 3030, 3034 also may store 3031, 3033 a session from an application server 3024, 3026, 3028 into remote random-access memory on another application server.

The arrangement of servers and other devices making up the exemplary system illustrated in FIG. 30 are for explanation, not for limitation. Data processing systems useful according to various embodiments of the present invention may include additional servers, routers, other devices, and peer-to-peer architectures, not shown in FIG. 30, as will occur to those of skill in the art. Networks in such data processing systems may be implemented as local area networks (LANs), wide area networks (WANs), intranets, internets, and others as will occur to those of skill in the art. Networks in such data processing systems may support many data communications protocols, including, for example, the Transmission Control Protocol (TCP), the Internet Protocol (IP), the HyperText Transfer Protocol (HTTP), the Wireless Access Protocol (WAP), the Handheld Device Transport Protocol (HDTP), and others as will occur to those of skill in the art. Various embodiments of the present invention may be implemented on a variety of hardware platforms in addition to those illustrated in FIG. 30.

Example System/Server

Figure 31:
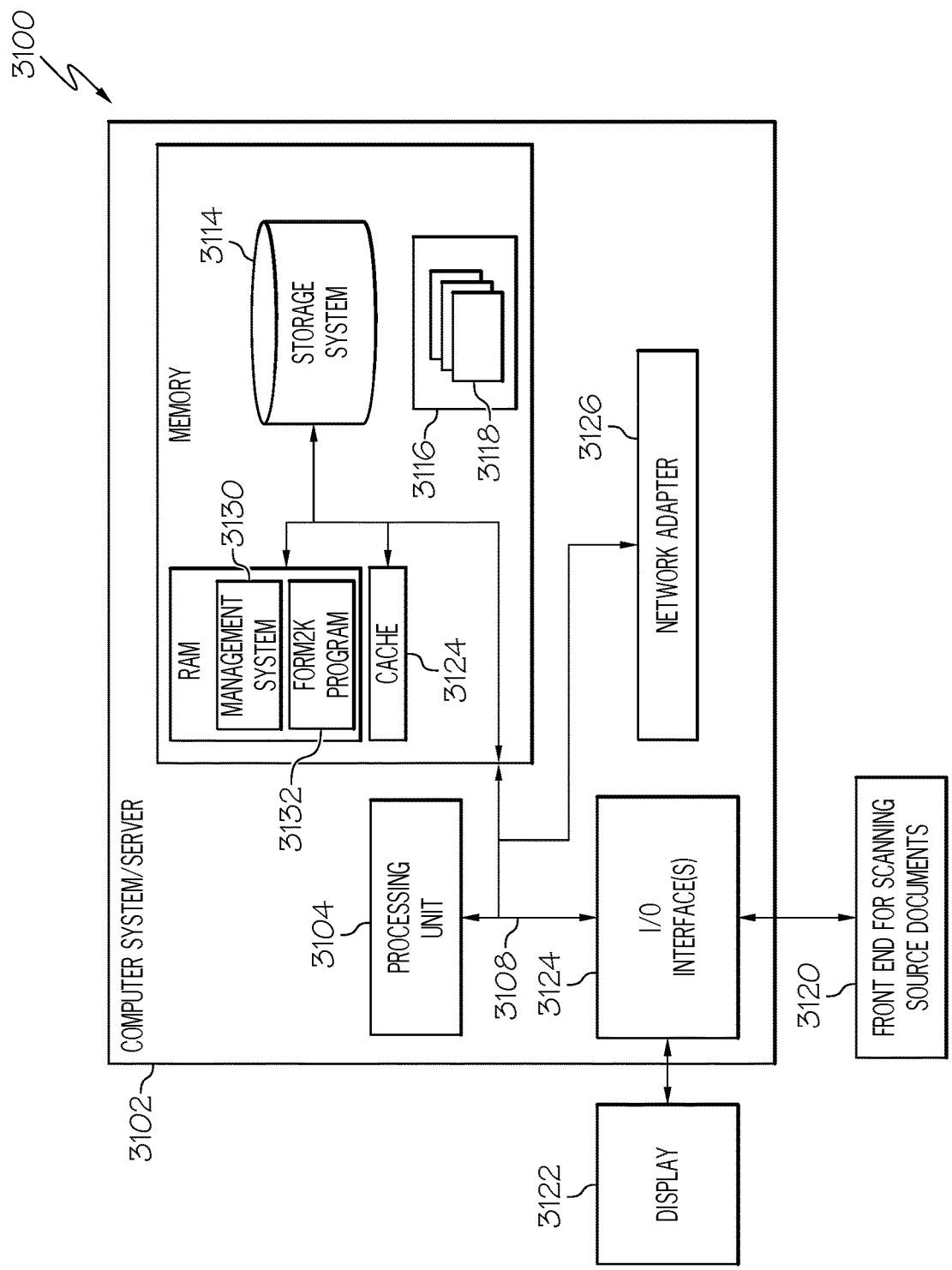
FIG. 31 is a block diagram of a computer system useful for implementing the software steps of the present invention.

FIG. 31 is a block diagram of a computer system useful for implementing the software steps of the present invention upon which flow diagrams of FIG. 4 through FIG. 6 can operate. FIG. 31 illustrates one example of a processing node and is not intended to suggest any limitation as to the scope of use or functionality of embodiments of the invention described herein. Regardless, the computing node 3100 is capable of being implemented and/or performing any of the functionality set forth hereinabove.

Referring now to FIG. 31, this figure is a block diagram 3100 illustrating an information processing system that can be utilized in embodiments of the present invention. The components of the information processing system 3102 can include, but are not limited to, one or more processors or processing units 3104, a system memory 3106, and a bus 3108 that couples various system components including the system memory 3106 to the processor 3104. The system memory 3106 can include the computer code for the FIG. 3 including the form2K portion.

The bus 3108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 3102 can further include other removable/non-removable, volatile/non-volatile computer system storage media. By way of example only, a storage system 3114 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 3108 by one or more data media interfaces. The memory 3106 can include at least one program product having a set of program modules that are configured to carry out the functions of an embodiment of the present invention.

Program/utility 3116, having a set of program modules 3118, may be stored in memory 3106 by way of example, and not limitation, as well as an operating system, one or more application programs, other program modules, and program data. Each of the operating system, one or more application programs, other program modules, and program data or some combination thereof, may include an implementation of a networking environment. Program modules 3118 generally carry out the functions and/or methodologies of embodiments of the present invention.

The information processing system 3102 can also communicate with one or more external devices 3120 such as a keyboard, a pointing device, a display 3122, etc.; one or more devices that enable a user to interact with the information processing system 3102; and/or any devices (e.g., network card, modem, etc.) that enable computer system/server 3102 to communicate with one or more other computing devices. Such communication can occur via I/O interfaces 3124. Still yet, the information processing system 3102 can communicate with one or more networks such as a local area network (LAN), a general wide area network (WAN), and/or a public network (e.g., the Internet) via network adapter 3126. As depicted, the network adapter 3126 communicates with the other components of information processing system 3102 via the bus 3108. Other hardware and/or software components can also be used in conjunction with the information processing system 3102. Examples include, but are not limited to: microcode, device drivers, redundant processing units, external disk drive arrays, RAID systems, tape drives, and data archival storage systems. The external devices in one example includes scanners and imagers that scan paper form filled documents and converts them into digital images, such as, the source documents 302 in FIG. 3.

Non-Limiting Examples

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method of extracting information from an image of a filled form document, the computer-based method comprising:
   accessing an image of at least one page of a filled form document, wherein the filled form document includes textual content with textual questions and textual answers and at least one graphical line separating a portion of the textual content;
   extracting textual content in the image into a set of text lines and extracting a structural layout of the textual content, wherein the structure layout includes a grouping textual content;
   creating a compositional hierarchy of textual content and the structural layout;
   assigning a form type to the image based on the compositional hierarchy of the textual content and structural layout; and
   based on the form type being assigned to a known form type, performing vertical merging of two or more lines in the set of text lines based on a relative position of the textual content and an absence of the at least one graphical line separating the two or more lines.

2. The computer-based method of claim 1, further comprising:
   comparing the textual content with the form type to identify a set of textual questions; and
   matching a textual answer to a textual question in the set of textual questions by a relative position of the textual question to a textual answer.

3. The computer-based method of claim 2, further comprising:
   creating a logical view of each textual answer including an identifier to the textual question that has been matched; and
   displaying each textual answer that has been matched to the textual question on a form type with a visual appearance distinct from a visual appearance of the set of textual questions on the form type.

4. The computer-based method of claim 3, wherein the displaying is updated based on a user selecting at least one of an confidence threshold value for the extracting the textual content, a confidence threshold for determining a textual answer to each textual question in the set of textual questions or a combination thereof.

5. A computer-based method of extracting information from an image of a document with textual content, the computer-based method comprising:
   accessing an image of at least one page of a document with textual content according to a structural layout separating portions of the textual content;
   extracting the textual content from the image into a set of text lines and extracting a structural layout of the textual content from the image;
   creating a compositional hierarchy of the textual content and the structural layout; and
   assigning a form type to the image based on a compositional hierarchy; and
   in response to the form type being assigned to a known form type, performing a vertical merging to combine text lines in the set of text lines based on a relative position of the text lines.

6. The computer-based method of claim 5, further comprising:
   matching text in the form type to a subset of text lines to identify a known set of text that includes a set of known textual questions and a set of textual answer candidates, wherein the matching text in the form type to the set of text lines to identify a known set of text that includes a set of known textual questions is independent of coordinate locations for text in the set of text lines in the image;
   determining a textual question to an answer candidate from the set of known textual questions by a relative position of the textual question to the set of textual answer candidates; and
   using the form type to create a logical data structure of each textual answer.

7. The computer-based method of claim 5, wherein the matching text in the form type to the set of text lines to identify a known set of text that includes a set of known textual questions which are similar in two different coordinate locations in the image for the form type.

8. The computer-based method of claim 5, wherein the determining a textual question to an answer candidate from the set of known textual questions by a relative position of the textual question to the set of textual answer candidates includes a null textual question to answer candidate match.

9. The computer-based method of claim 5, wherein the matching text in the form type to the set of text lines to identify a known set of text that includes a set of known textual questions and a set of textual answer candidates further includes a set of known textual content for titles, sections, sub-sections, instructions or a combination thereof.

10. The computer-based method of claim 5, wherein the matching text in the form type to the set of text lines to identify a known set of text that includes a set of known textual questions includes using a Levenshtein distance between text in the form type and the set of text lines.

11. The computer-based method of claim 5, wherein the matching text in the form type to the set of text lines to identify a known set of text that includes a set of known textual questions includes prior to the matching text performing includes at least one converting the set of text lines to a one case, removing character spaces in the set of text lines, removing back to line characters in the set of text lines or a combination thereof.

12. The computer-based method of claim 5, wherein the determining a textual answer to each known textual question in the set of known textual questions by a relative position of the known textual question to a set of textual answer candidates includes discarding the textual answer which includes at least one of begins with a space character, begins with a back of line character, ends with a space character, or a combination thereof.

13. The computer-based method of claim 5, wherein the determining a textual answer to each known textual question in the set of known textual questions by a relative position of the known textual question to a set of textual answer candidates includes using machine learning to identifying the textual answers using classifications based on at least one of location features, typographical features, visual features, density features, or a combination thereof.

14. The computer-based method of claim 5, wherein the performing a vertical merging to combine text lines in the set of text lines based on a relative position of the text lines and an absence of at least one graphical line in between the text lines.

15. The computer-based method of claim 5, wherein the performing a vertical merging to combine text lines in the set of text lines based on a relative position of the text lines includes using machine learning to identify the text lines to combine using classification based on at least one of location features, typographical features, visual features, density features or a combination thereof.

16. The computer-based method of claim 5, wherein the using the form type to create a logical data structure of each textual answer includes logical data structure of each known textual question.

17. The computer-based method of claim 5, wherein the extracting the textual content from the image into a set of text lines and extracting a structural layout of the textual content from the image includes detecting graphical lines prior to detecting text.

18. The computer-based method of claim 5, wherein the extracting the textual content from the image into a set of text lines and extracting a structural layout of the textual content from the image includes detecting tickbox characters with a tickbox classifier using machine learning.

19. The computer-based method of claim 5, wherein the assigning a form type to the image based on a compositional hierarchy of the textual content and the structural layout includes a form type with at least on designator of a format for a textual question of tabular content type, tickbox content type, or a combination thereof.

20. The computer-based method of claim 5, wherein the matching text in the form type to the set of text lines to identify a known set of text includes using a designator that indicates a line of text in the form type has a semantically similar meaning to a line of text in the set of text lines.

21. A non-transitory computer program product tangibly embodying computer readable instructions which, when implemented, cause a computer to carry out the steps of a method for extracting information from an image of a document with textual content, comprising:
   accessing an image of at least one page of a document with textual content according to a structural layout separating portions of the textual content;
   extracting the textual content from the image into a set of text lines and extracting a structural layout of the textual content from the image;
   creating a compositional hierarchy of the textual content and the structural layout;
   assigning a form type to the image based on a compositional hierarchy; and
   based on the form type being assigned to a known form type, performing vertical merging of two or more lines in the set of text lines based on a relative position of the textual content and an absence of the at least one graphical line separating the two or more lines.

22. The non-transitory computer program product of claim 21, further comprising:
   in response to the form type being assigned to a known form type, performing a vertical merging to combine text lines in the set of text lines based on a relative position of the text lines, wherein the matching text in the form type to the set of text lines to identify a known set of text that includes a set of known textual questions is independent of coordinate locations for text in the set of text lines in the image;
   matching text in the form type to a subset of text lines to identify a known set of text that includes a set of known textual questions and a set of textual answer candidates;
   determining a textual question to an answer candidate from the set of known textual questions by a relative position of the textual question to the set of textual answer candidates; and
   using the form type to create a logical data structure of each textual answer.

23. The non-transitory computer program product of claim 21, further comprising:
   comparing the textual content with the form type to identify a set of textual questions; and
   matching a textual answer to a textual question in the set of textual questions by a relative position of the textual question to a textual answer.

24. The non-transitory computer program product of claim 23, further comprising:
   creating a logical view of each textual answer including an identifier to the textual question that has been matched; and
   displaying each textual answer that has been matched to the textual question on a form type with a visual appearance distinct from a visual appearance of the set of textual questions on the form type.

25. The non-transitory computer program product of claim 24, wherein the displaying is updated based on a user selecting at least one of an confidence threshold value for the extracting the textual content, a confidence threshold for determining a textual answer to each textual question in the set of textual questions or a combination thereof.

\* \* \* \* \*